(12) United States Patent
Angell et al.

(10) Patent No.: US 7,504,473 B2
(45) Date of Patent: *Mar. 17, 2009

(54) CONDUCTIVE POLYMERIC COMPOSITIONS FOR LITHIUM BATTERIES

(75) Inventors: Charles A. Angell, Mesa, AZ (US); Wu Xu, Tempe, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/311,643

(22) PCT Filed: Jun. 16, 2001

(86) PCT No.: PCT/US01/41009

§ 371 (c)(1),
(2), (4) Date: Sep. 3, 2003

(87) PCT Pub. No.: WO01/96446

PCT Pub. Date: Dec. 20, 2001

(65) Prior Publication Data

US 2004/0054126 A1 Mar. 18, 2004

Related U.S. Application Data

(60) Provisional application No. 60/290,864, filed on May 14, 2001, provisional application No. 60/212,231, filed on Jun. 16, 2000.

(51) Int. Cl.
*C08G 63/02* (2006.01)
*C08G 63/00* (2006.01)

(52) U.S. Cl. .................. 528/272; 252/62.2; 252/518.1; 252/519.2; 429/188; 429/303; 429/311; 429/313; 429/319; 429/322; 429/324; 524/81; 524/82; 524/205; 528/271

(58) Field of Classification Search ................. 429/188, 429/303, 311, 313, 319, 322, 324, 330; 528/271, 528/272; 252/62.2, 518.1, 519.21, 519.2; 524/81, 82, 205

See application file for complete search history.

(56) References Cited

U.S. PATENT DOCUMENTS

| 2,871,222 A | 1/1959 | Finestone |
| 3,161,613 A | 12/1964 | Sprung |
| 3,203,928 A | 8/1965 | Willcockson et al. |
| 3,259,591 A | 7/1966 | Shepherd |
| 3,487,045 A | 12/1969 | Shepard et al. |
| 4,228,270 A | 10/1980 | Kobayashi |
| 4,620,944 A | 11/1986 | Armand et al. |
| 4,731,408 A * | 3/1988 | Jasne ................. 524/458 |
| 5,484,670 A | 1/1996 | Angell et al. |
| 5,506,073 A | 4/1996 | Angell et al. |
| 5,660,947 A | 8/1997 | Wuhr |
| 5,786,110 A | 7/1998 | Angell et al. |
| 5,807,905 A | 9/1998 | Cunningham et al. |
| 5,824,433 A | 10/1998 | Angell et al. |
| 5,849,432 A | 12/1998 | Angell et al. |
| 5,855,809 A | 1/1999 | Angell et al. |
| 5,874,616 A | 2/1999 | Howells |
| 5,962,169 A | 10/1999 | Angell et al. |
| 6,210,838 B1 | 4/2001 | Fujinami et al. |
| 6,221,941 B1 | 4/2001 | Strauss et al. |
| 6,235,433 B1 | 5/2001 | Amano et al. |
| 6,245,465 B1 | 6/2001 | Angell et al. |
| 6,485,868 B1 | 11/2002 | Tsujioka et al. |
| 6,506,516 B1 | 1/2003 | Wietelmann et al. |
| 6,548,212 B1 | 4/2003 | Heider et al. |
| 6,924,066 B2 | 8/2005 | Heider et al. |
| 7,012,124 B2 | 3/2006 | Angell et al. |
| 2004/0034253 A1 | 2/2004 | Angell et al. |
| 2006/0189776 A1 | 8/2006 | Angell et al. |
| 2007/0026295 A1 | 2/2007 | Angell et al. |
| 2007/0122675 A1 | 5/2007 | Angell et al. |
| 2007/0298326 A1 | 12/2007 | Angell et al. |

FOREIGN PATENT DOCUMENTS

| CA | 2336323 | 1/2000 |
| DE | 198 29 030 C | 10/1999 |
| EP | 708452 | 4/1996 |
| EP | 1035612 | 2/2000 |
| EP | 1 035 612 A1 | 9/2000 |

(Continued)

OTHER PUBLICATIONS

Fujinami, T., et al., "Siloxyaluminate polymers with high Li+ ion conductivity", article, Chem Mater, 1997, 9:2236-39.
Mehta, et al., "Boroxine Ring Containing Polymer Electrolytes", J. Power Sources, 81-82, pp. 724-728, 1999.
Onishi, K., et al., "Lithium/polyaniline secondary battery composed of transport-number-adjusted aluminate solid polymer electrolytes", article, J Electrochem Soc, 147(6), 2039-43, 2000.
Onishi, K. et al., "Thioaluminate polymer complexes as single-ionic solid electrolytes", article, Chem Mater 1998, 10, 927-31.
Rawsky, G. et al., "Aluminosilicate/poly(ethylene glycol) copolymers: a new class of polyelectrolytes", article Chem Mater 1994, 6, 2208-09.

(Continued)

*Primary Examiner*—Terressa M Boykin
(74) *Attorney, Agent, or Firm*—Fish & Richardson P.C.

(57) ABSTRACT

Novel chain polymers comprising weakly basic anionic moieties chemically bound into a polyether backbone at controllable anionic separations are presented. Preferred polymers comprise orthoborate anions capped with dibasic acid residues, preferably oxalato or malonato acid residues. The conductivity of these polymers is found to be high relative to that of most conventional salt-in-polymer electrolytes. The conductivity at high temperatures and wide electrochemical window make these materials especially suitable as electrolytes for rechargeable lithium batteries.

50 Claims, 18 Drawing Sheets

FOREIGN PATENT DOCUMENTS

| | | |
|---|---|---|
| EP | 1 074 555 | 2/2001 |
| EP | 1 075 036 | 2/2001 |
| EP | 1 074 555 A2 | 7/2001 |
| EP | 1 075 036 A2 | 7/2001 |
| JP | 1020276 | 1/1991 |
| JP | 3059909 | 3/1991 |
| JP | 3115371 | 5/1991 |
| JP | 11-54151 | 2/1999 |
| JP | 11-185817 | 7/1999 |
| JP | 2000-69202 | 3/2000 |
| JP | 2000-173589 | 6/2000 |
| JP | 2000173343 | 6/2000 |
| JP | 2000-268863 | 9/2000 |
| WO | WO 98/07729 | 2/1998 |
| WO | WO 98/28807 | 7/1998 |
| WO | WO 00/00495 | 1/2000 |
| WO | WO 01/98396 | 12/2001 |
| WO | WO 01/99209 | 12/2001 |

OTHER PUBLICATIONS

Sun, X., et al, "Polyanionic electrolytes with high alkali ion conductivity", article, J Phys: Condens Matt, 13, 8235-43, 2001.

Xu, W., et al., "A fusible orthoborate lithium salt with high conductivity in solutions", article, Electrochem Solid-State let, 3(8) 366-68, 2000.

Angell, C., et al., "Variations of the Salt-Polymer Electrolyte Theme for Flexible Solid Electrolytes", article, Solid State Ionics, 86-88, 17-28, 1996.

Angell, C., et at., "Rubbery Solid Electrolytes with Dominant Catronic Transport and High Ambient Conductivity", article, Nature, 362, 137-139, Mar. 11, 1993.

MacCallum, J., et al., (eds.), Polymer Electrolytes Reviews, book, V 1, Elsevier, London, 1987.

Ohno, H., "Molten Salt Type Polymer Electrolytes", Electrochimica Acta, 46, 1407-1400, 2001.

Shang, S., et al., "Molecular and Anionic Polymer System with Micro-Decoupled Conductivities", article, electrochimica Acta, 45, 12-29, 2000.

Xu, W., et al., "LiBOB and Its Derivatives, Weakly Coordinating Anions, and the Exceptional Conductivity of Their Nanaqueous Solutions", article, Electrochem & Solid State Lett, 4, E1, 2001.

Angell, C., et al., "Fusible Orthoborate Lithium Salt with High Conductivity in Solutions", article, Electrochem Solid State Lett, V 3(8), pp. 366-368, Jun. 14, 2000.

Angell, C., et at., "Rubbery Solid Electrolytes with Dominant Catronic Transport and High Ambient Conductivity", article, Nature, 362, pp. 137-139, Mar. 11, 1993.

Barthel, J., et al., "A New Class of Electrochemically and Thermally Stable Lithium Salts for Lithium Battery Electrolytes", article, J Electrochem Soc, V 143, p. 3572, 1996.

Barthel, J., et al., "A New Class of Electrochemically and Thermally Stable Lithium Salts for Lithium Battery Electrolytes", article, J Electrochem Soc, V 147, p. 21, 2000.

Bessler, E., et al., "Boron complexes with Bis Dicrboxylic(Oxalato)Borate and with Bis (Malonato)Borate Acids", article, Zeitschrift fuer Naturforschung, V 37B(8), pp. 1020-1025.

Hergott, H., et al., "Eine einfache Syntheses von Trichloromethyltrimethylsilan and Carbonsaure-trimethylsilylestern", article, Synthesis, V626, 1980.

Krause, L., et al., "Corrosion of aluminum at high voltages in non-aqueous electrolytes containing perfluoroalkylsulfonyl imides; new lithium salts for lithium-ion cells", article, J Power Sources, V 68, p. 320, 1997.

Sloop, S., et al., "Chemical Reactivity of PF5 and LiPF6 in Ethylene Carbonate/Dimethyl Carbonate Solutions", article, Electrochem & Solid State Lett, V 4, p. A42, 2001.

Xu, W., et al., "LiBOB and Its Derivatives, Weakly Coordinating Anions, and the Exceptional Conductivity of Their Nonaqueous Solutions", article, Electrochem Solid State Lett, V 4(1), pp. E1-E4, 2001.

Zhang, S., et al., "Molecular and anionic polymer and oligomer systems with microdecoupled conductivities", article, Electrochem Acta 45, 12-29, 2000.

Angell et al., "Li-conducting ionic rubbers for lithium battery and other applications," Solid State Ionics, vol. 69, p. 343-353 (1994).

Angell, C.A., "Fast Ion Motion in Glassy and Amorphous Materials," Solid State Ionica, 9 & 10, p. 3-16 (1983).

Armand, M. et al., "Perfluorosulphonimide Salts as Solute for Polymer Electrolytes," Proceedings of the Second International Symposium onPolymer-Electrolytes, B. Scrosati, Editor, Elsevier, New York, p. 91-97 (1990).

Armand, M., "A History of Polymer Electrolytes," Solid State Ionics, 69: p. 309-319 91994).

Bruce et al., "The determination of transferencec numbers in solid polymer electrolytes using the Hittorf method," Solid State Ionics, 53-56, p. 10807-1094 (1992).

Ito et al, "Effect of Terminal groups on the ionic conductivity of $\alpha$, $\omega$-discharge poly(ethylene oxide) oligomers," Solid State Ionics, 86-88, p. 325-328 (1996).

Ito et al., "Polyether/salt hybrid (IV). Effect of benzenesulfonate groups(s) and PEO molecular weight on the bulk ionic conductivity," Electrochimica, Acta, 42, p. 1561-1570 (1997).

Ohno et al., "Ionic Conductivity of Molten Salts Formed by Polyether/Salt Hybrids," Chemistry Letters, p. 15-16 (1998).

Xu, K. and C.A. Angell, "Non-Crystallizing Molten Salt and Ionic Rubber Electrolytes with Wide Electrochemical Windows," Materials Research Society Symposium Proceedings, Solid State Ionicsm IV, Symposium held Nov. 28-Dec. 1, 1994, Boston, Massachusetts, U.S.A., vol. 369, p. 505-510 (1995).

Xu, K. and C.A., Angell, "Synthesis and Characterization of Lithium Sulfonates as Componenets of Molten Salt Electrolytes," Electrochimica, Acta vol. 40, p. 2401-2403 (1995).

Xu, et al., "Fusible Orthoborate Lithium Salt with High Conductivity in Solutions", article, Electrochem Solid State Lett, V 3(8), pp. 366-368, Jun. 14, 2000.

Barthel, J., et al., "A New Class of Electrochemically and Thermally Stable Lithium Salts for Lithium Battery Electrolytes", article, J Electrochem Soc, V 143, p. 3572, 1996.

Barthel, J., et al., "A New Class of Electrochemically and Thermally Stable Lithium Salts for Lithium Battery Electrolytes", article, J Electrochem Soc, V 147, p. 21, 2000.

Bessler, E., et al., "Boron complexes with Bis Diorboxylic(Oxalato)Borate and with Bis (Malonato)Borate Acids", article, Zeitschrift fuer Naturforschung, V 37B(8), pp. 1020-1025, 1982.

Hergott, H., et al., "Eine einfache Syntheses von Trichloromethyltrimethylsilan and Carbonsaure-trimethylsilyestern", article, Synthesis, V262, 1980.

Krause, L., et al., "Corrosion of aluminum at high voltages in non-aqueous electrolytes containing perfluoroalkysulfonyl imides; new lithium salts for lithium-ion cells", article, J Power Sources, V 68, p. 320, 1997.

Sloop, S., et al., "Chemical Reactivity of PF5 and LiPF6 in Ethylene Carbonate/Dimethyl Carbonate Solutions", article, Electrochem & Solid State Lett, V4, p. A42, 2001.

Xu et al., "LiMOB, an unsymmetrical non-aromatic orthoborate salts for non-aqueous solution electrochemical applications," J. Electrochem. Soc 151 (4): A632-A638 2004.

Xu et al., "Novel Polyanionic Solid Electrolytes with Weak Coulomb Traps and Controllable Caps and Spacers," Chem Mater. 14: 401-409 (2002).

Xu et al., Ionic Liquids of Chelated Orthoborates as Model Ionic Glassformers, J. Phys. Chem. 107: 11749-11756 (2003).

Xu et al., "Preparation and characterization of novel "polyMOB" polyanionic solid electrolytes with weak coulomb traps," State State Ionics 147:295-301 (2002).

Xu, W. and C.A., Angell, "Solvent-Free Electrolytes with Aqueous Solution-Like Conductivities," Science 302: 422-eoa (Oct. 17, 2003).

Xu et al., "LiBOB as Salt for Lithium-Ion Batteries," Electrochemical and Solid-State Letters 5(1): A26-A29 (2002).

Mehta et al., "The use of boroxine rings for the development of high performance polymer electrolytes," Electrochemica Acta 45:1175-1180(2000).

Onishi et al. "Thioaluminate polymer complexes as single-ionic solid electrolytes." 1998. Chem. Abstracts 128:224296 (See.

Kanbara et al. Ion-conductive polymer electrolyte, its production, and capacitors using it. Apr. 1996. Chem. Abstracts 125:24138. See EP708452.

Rawsky et al. "Aluminosilicate/Poly(ethyleneglycol) copolymers: A new class of Polyelectrolytes." 1994. Chem. Abstracts 121:281368.

Saito et al. Transparent electrically conductive resin compositions and laminates thereof. May 1991. Chem Abstracts 115:184646.

Nose et al. "Anchoring coatings in electrically conducting plastic films." Mar. 1991. Chem. Abstracts. 115:94059.

Yamaguchi et al. "Cooper powder containing electrically conductive coatings." Jan. 1989. Chem. Abstracts 112:8780.

Translation of Japanese Office Action for Patent Application No. 2002/503959, mailed Jun. 23, 2004; 5 pages.

International Search Report for PCT/US01/41009, mailed Sep. 14, 2001; 2 pages.

International Preliminary Examination Report for PCT/US01/41009, mailed Jan. 28, 2003; 5 pages.

International Search Report for PCT/US01/19338, mailed Nov. 29, 2001; 1 page.

International Search Report for WO 01/99209, mailed Jan. 23, 2002; 4 pages.

Carey, Textbook: Organic Chemistry, McGraw Hill, Second Edition, 1992, pp. 50-54, 60-63, 75, 119-121, 140-141, 149-155, and Table.

* cited by examiner

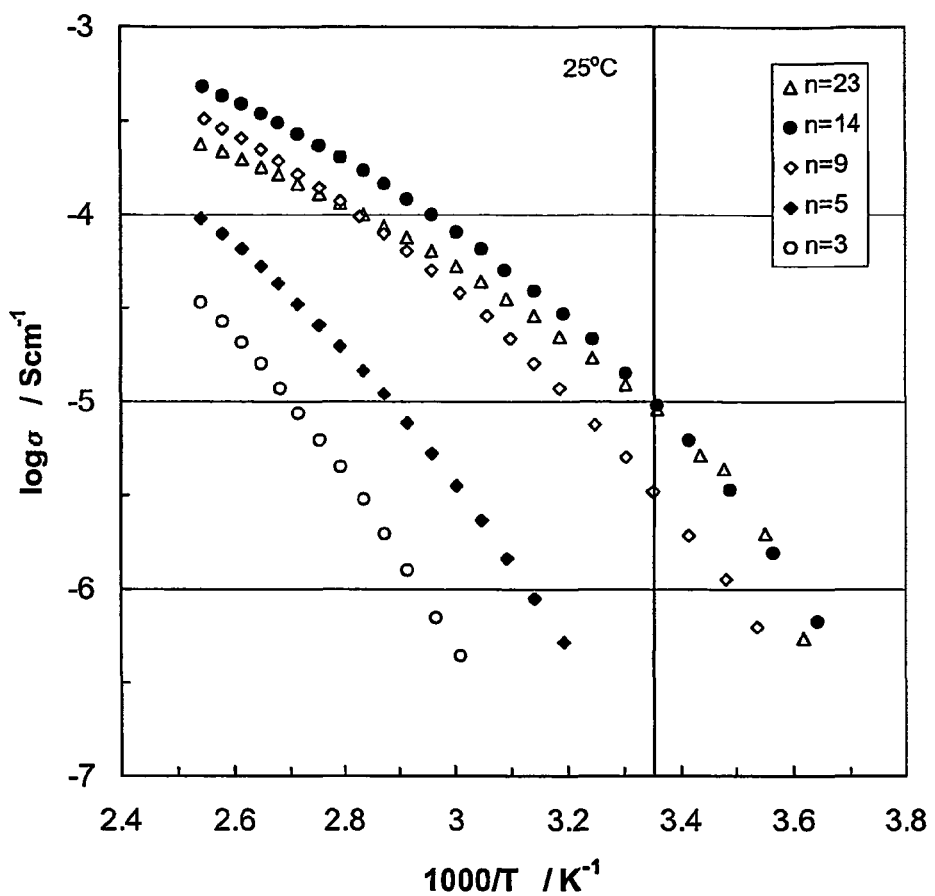
Figure 1. Temperature dependence of ionic conductivities of PEG-spaced polyMOBs, P(LiOEG$_n$B), where the length of spacer EG$_n$ is 3 to 23.

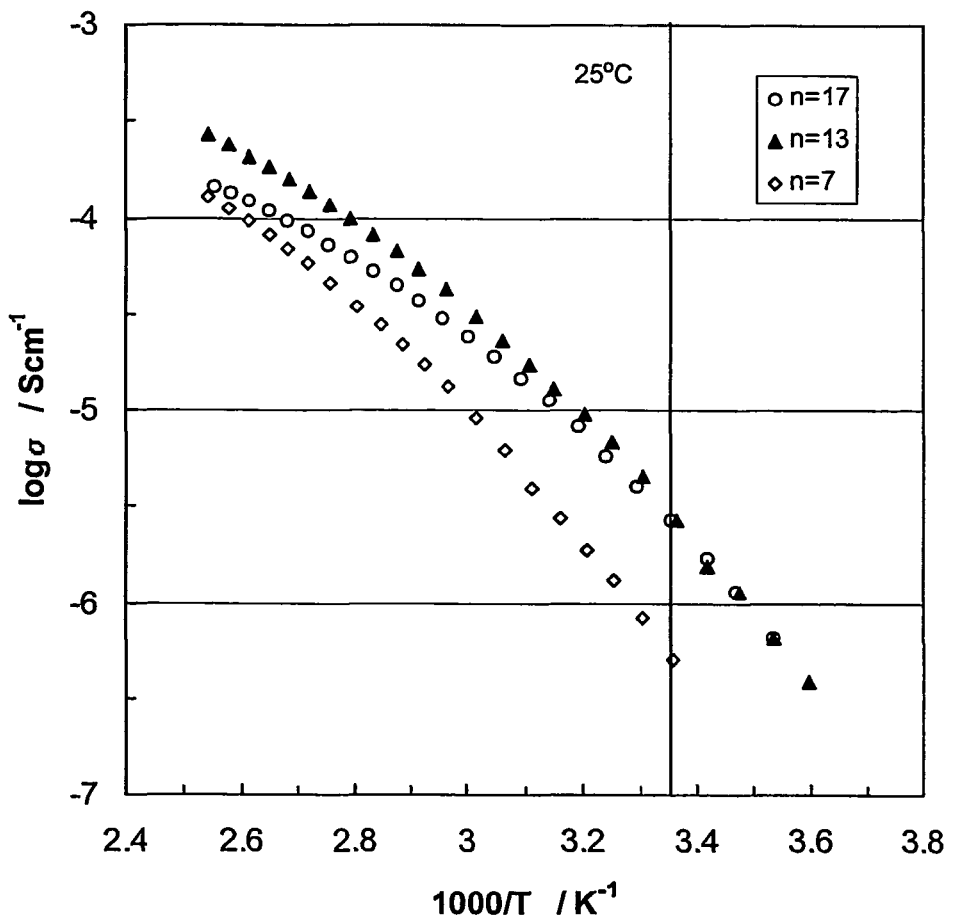
Figure 2. Temperature dependence of ionic conductivities of PPG-spaced polyMOBs, P(LiOPG$_n$B), where the length of spacer PG$_n$ is 7 to 17.

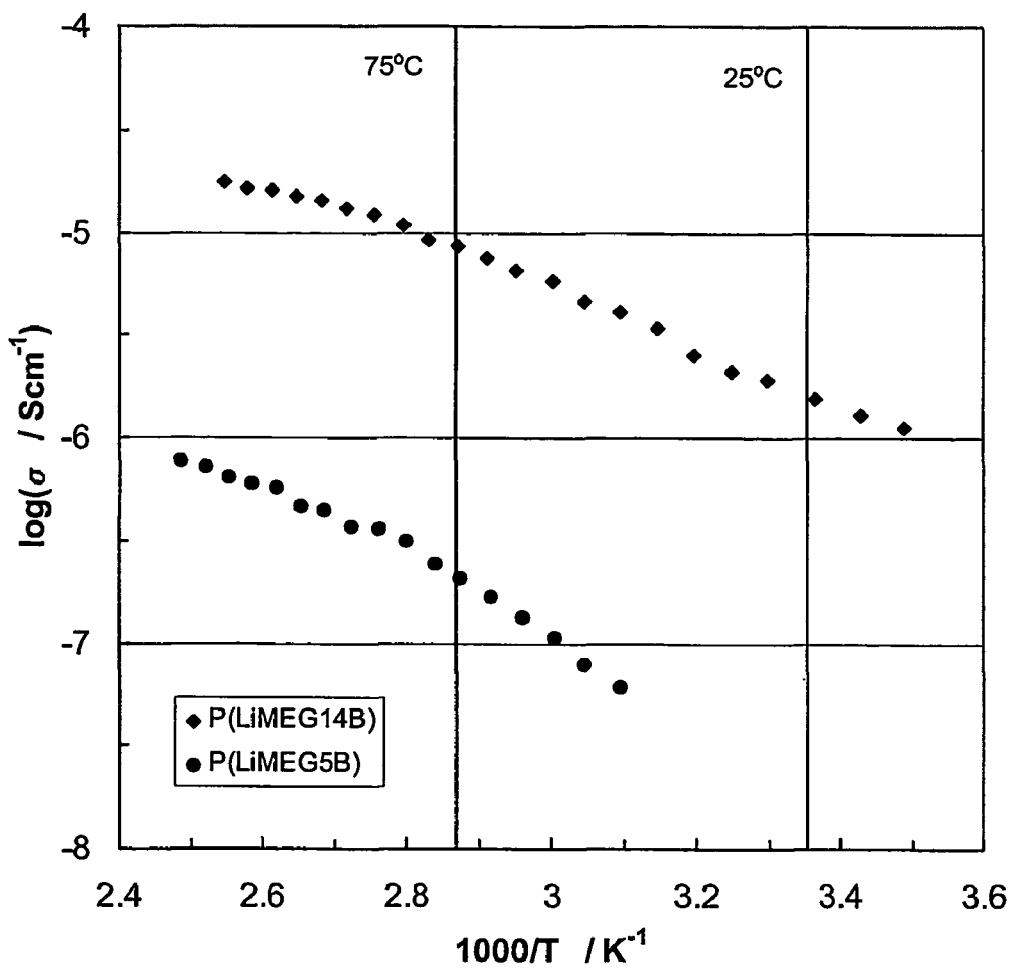
Figure 3. Temperature dependence of ionic conductivities of PEG-spaced polyMMBs, P(LiMEG$_n$B), where the length of spacer EG$_n$ is 5 and 14.

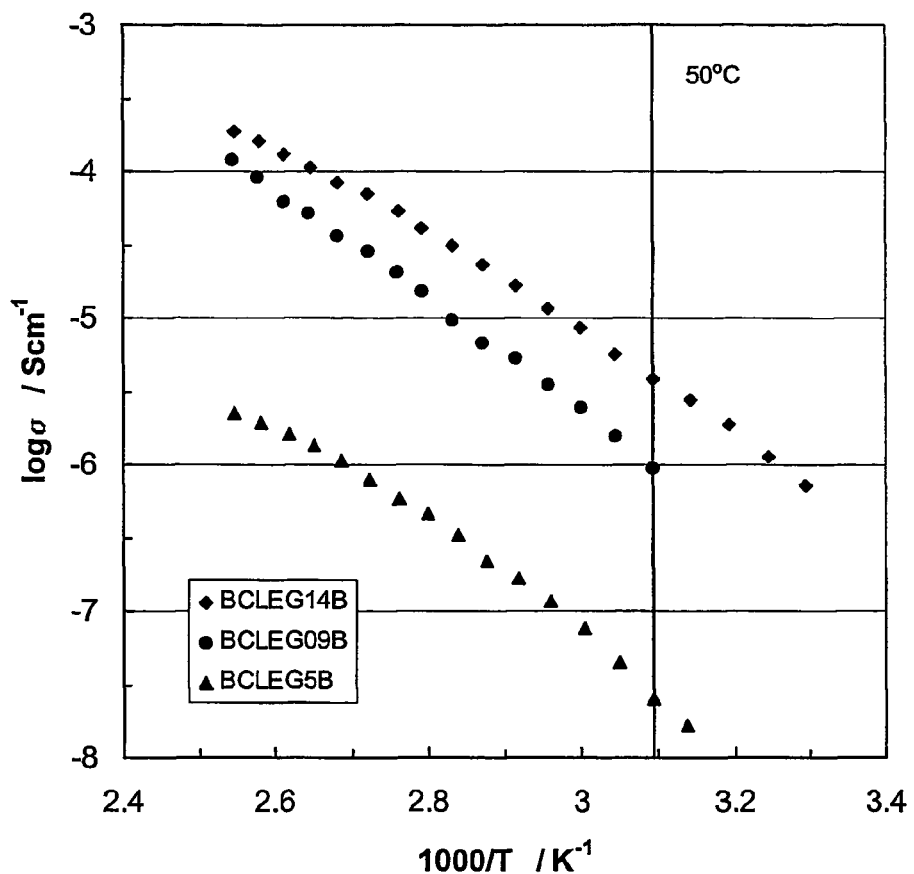
Figure 4. Temperature dependence of ionic conductivities of LiBH$_4$ crosslinked PEG-spaced polyMOBs, BCLEG$_n$B, where the length of spacer EG$_n$ is 5 to 14.

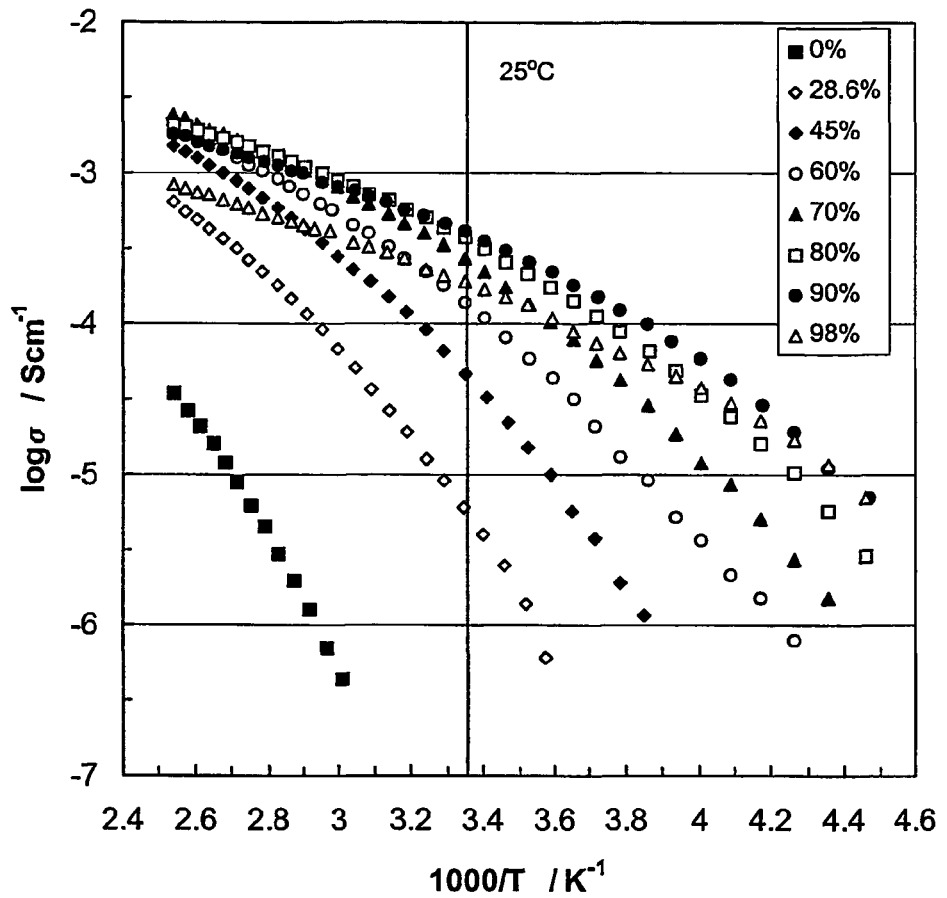
Figure 5A. Temperature dependence of ionic conductivity of EC-PC (1:1) plasticized P(LiOEG$_3$B) with different EC-PC content.

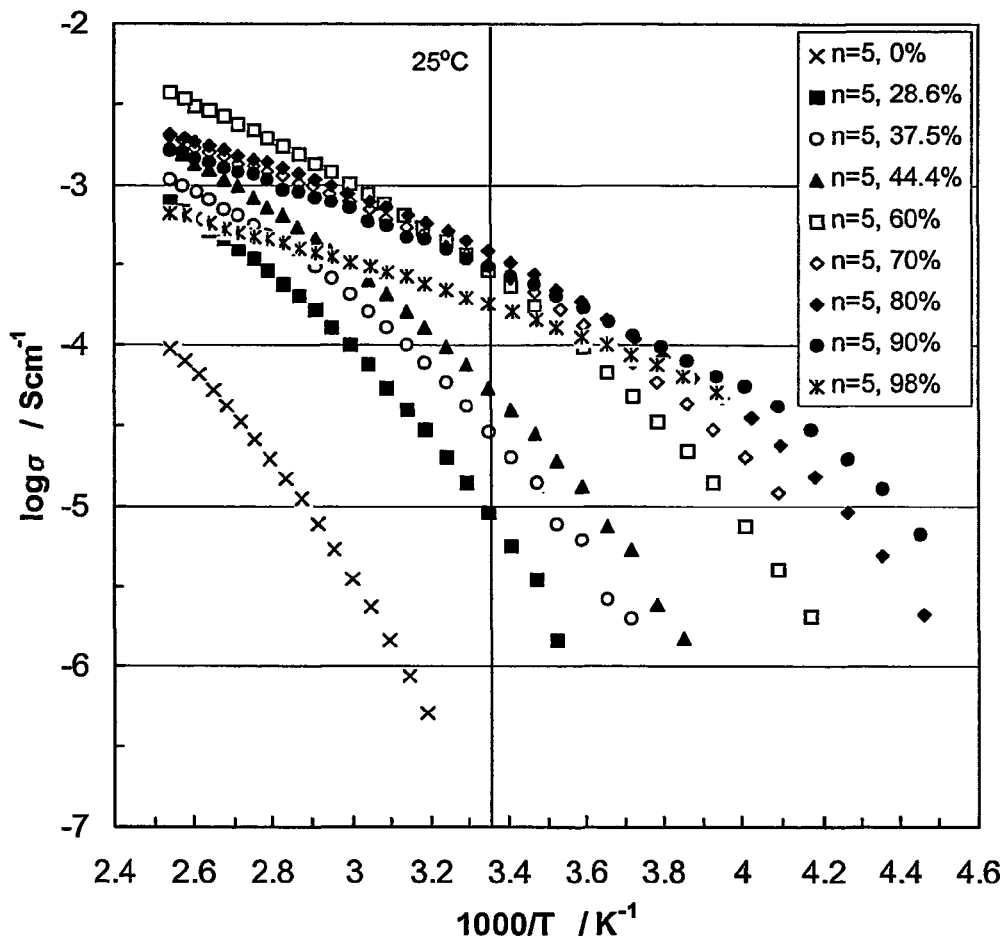
Figure 5B. Temperature dependence of ionic conductivity of EC-PC (1:1) plasticized P(LiOEG$_5$B) with different EC-PC content.

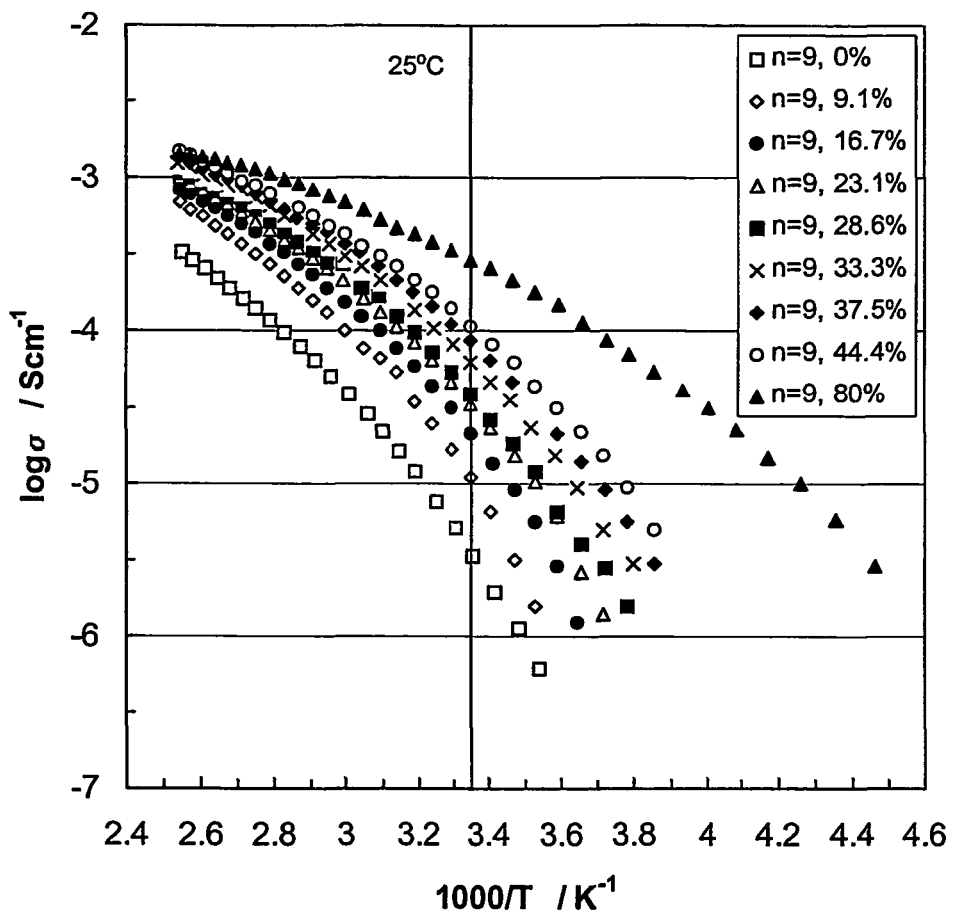
Figure 5C. Temperature dependence of ionic conductivity of EC-PC (1:1) plasticized P(LiOEG$_9$B) with different EC-PC content.

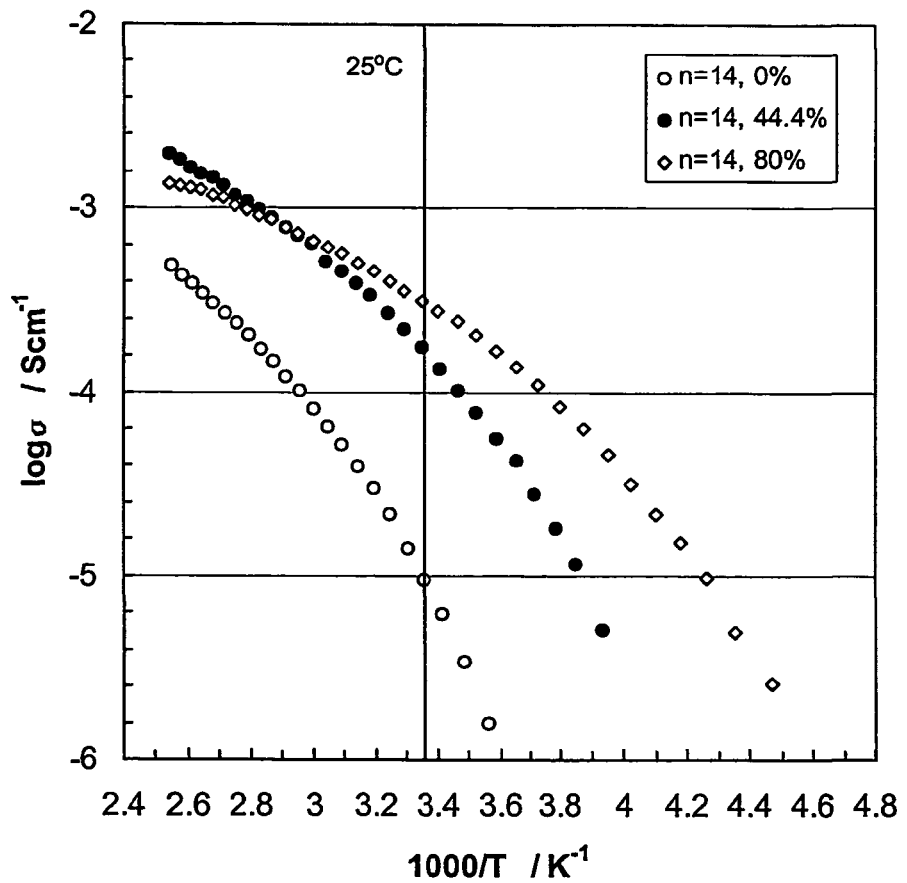
Figure 5D. Temperature dependence of ionic conductivity of EC-PC (1:1) plasticized P(LiOEG$_{14}$B) with different EC-PC content.

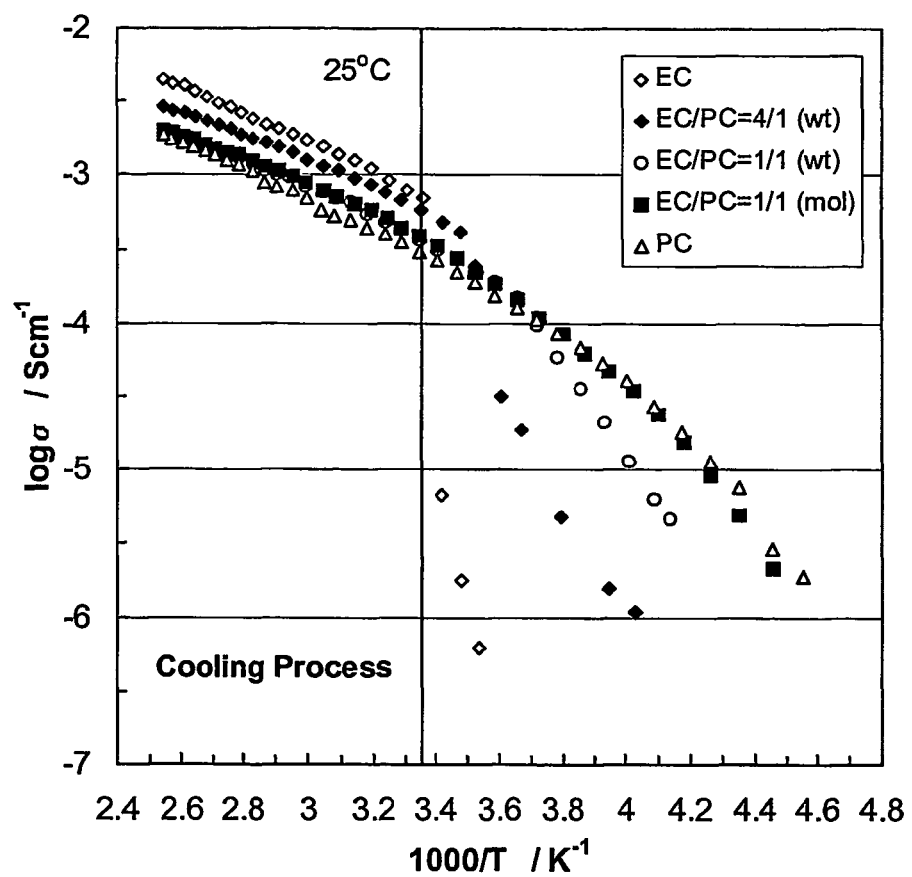
Figure 6. Temperature dependence of ionic conductivity of plasticized P(LiOEG$_5$B) by different EC-PC compositions.

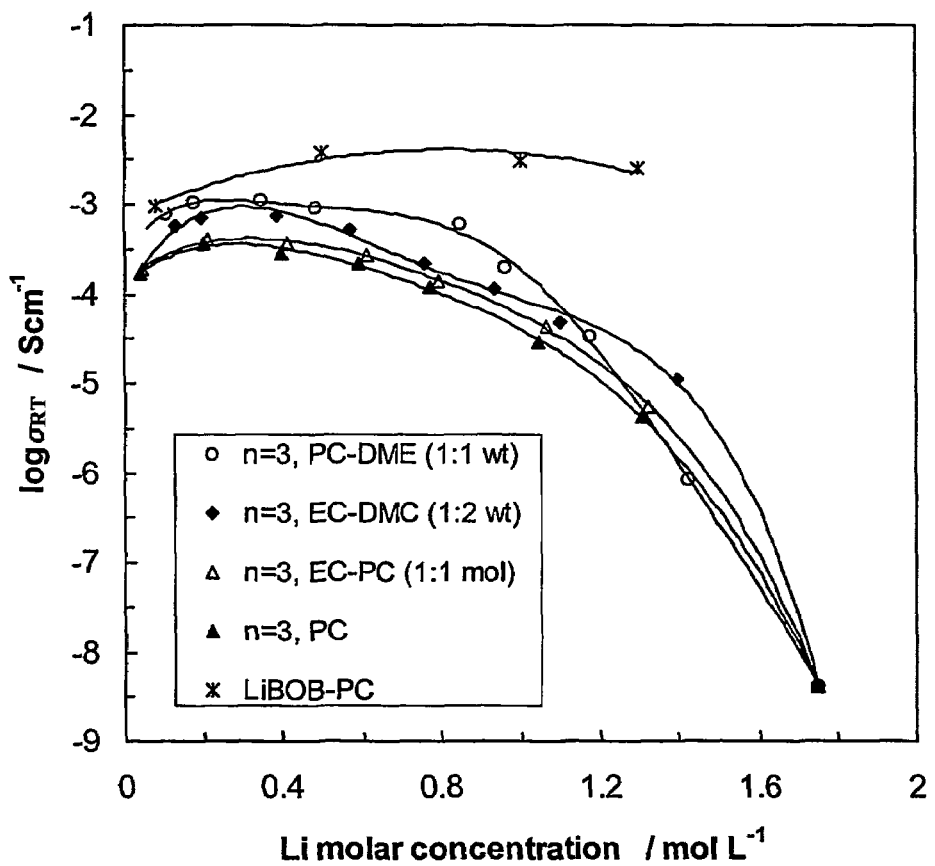
Figure 7. The room temperature conductivity of P(LiOEG$_3$B) plasticized by different solvents and solvent mixtures with the variation of lithium concentrations. Comparison is also made with the conductivity of simple LiBOB solutions in PC. Remembering that our conductivity is entirely due to Li$^+$ cations, these results are seen as highly promising.

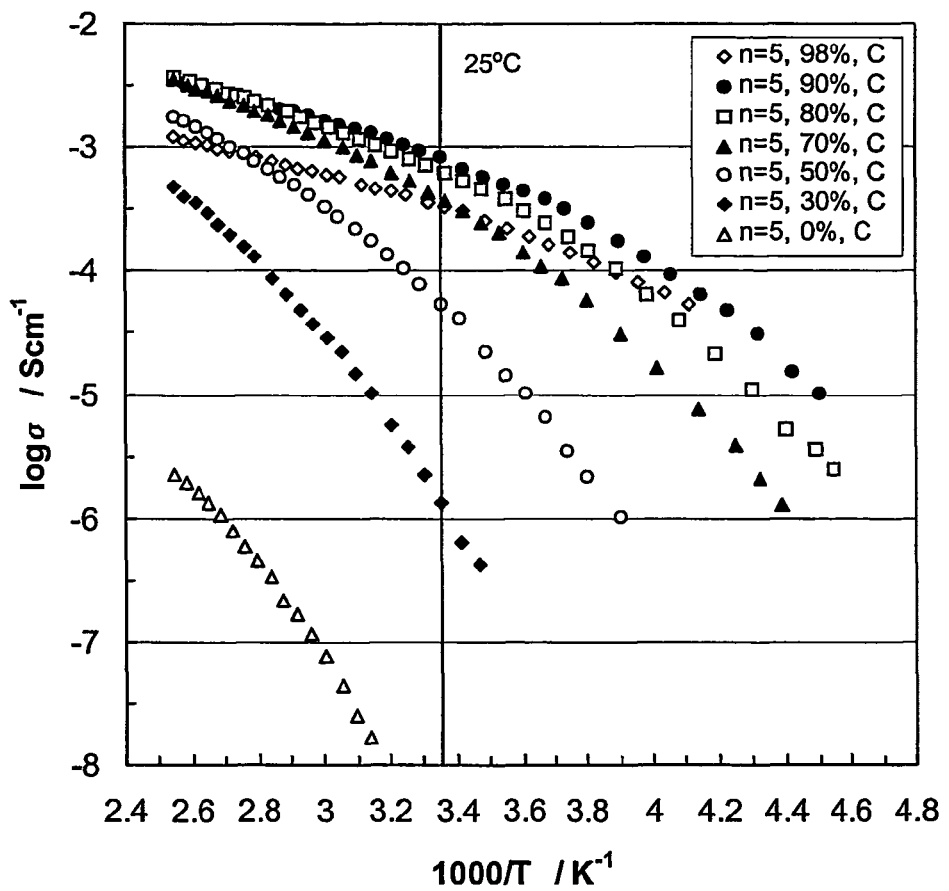
Figure 8A. Temperature dependence of ionic conductivity of EC-PC (1:1 by wt) plasticized LiBH$_4$-crosslinked P(LiOEG$_5$B) with different content of plasticizer.

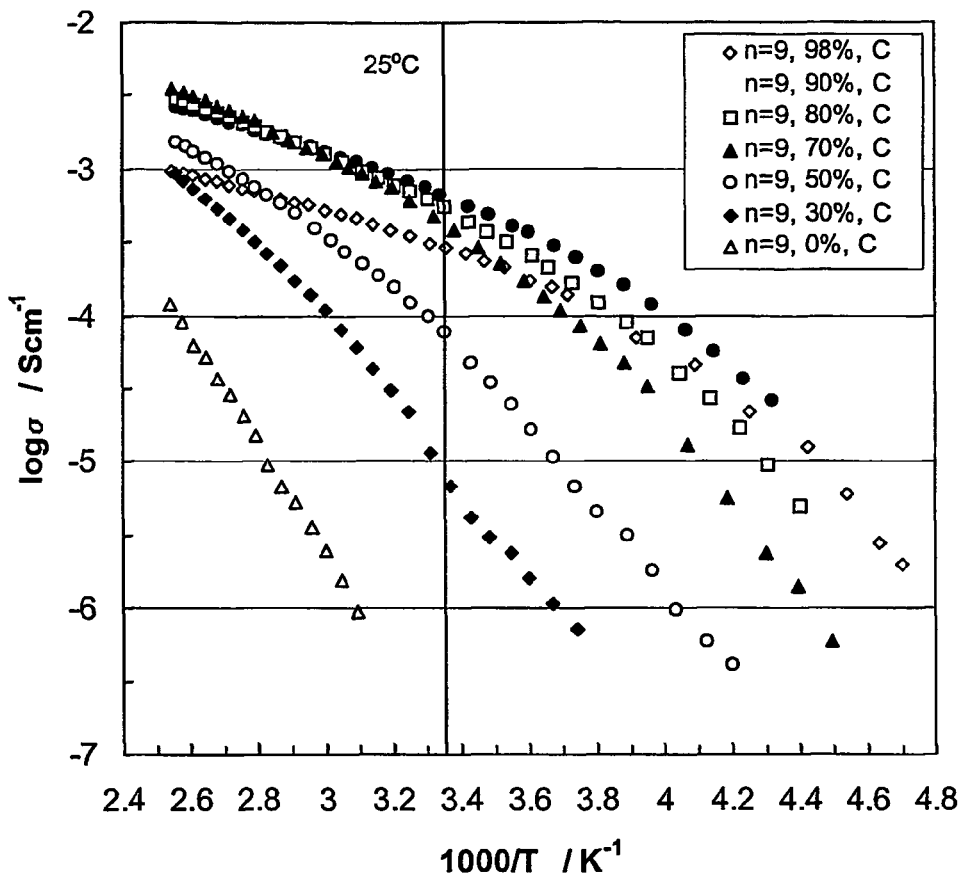
Figure 8B. Temperature dependence of ionic conductivity of EC-PC (1:1 by wt) plasticized LiBH$_4$-crosslinked P(LiOEG$_9$B) with different content of plasticizer.

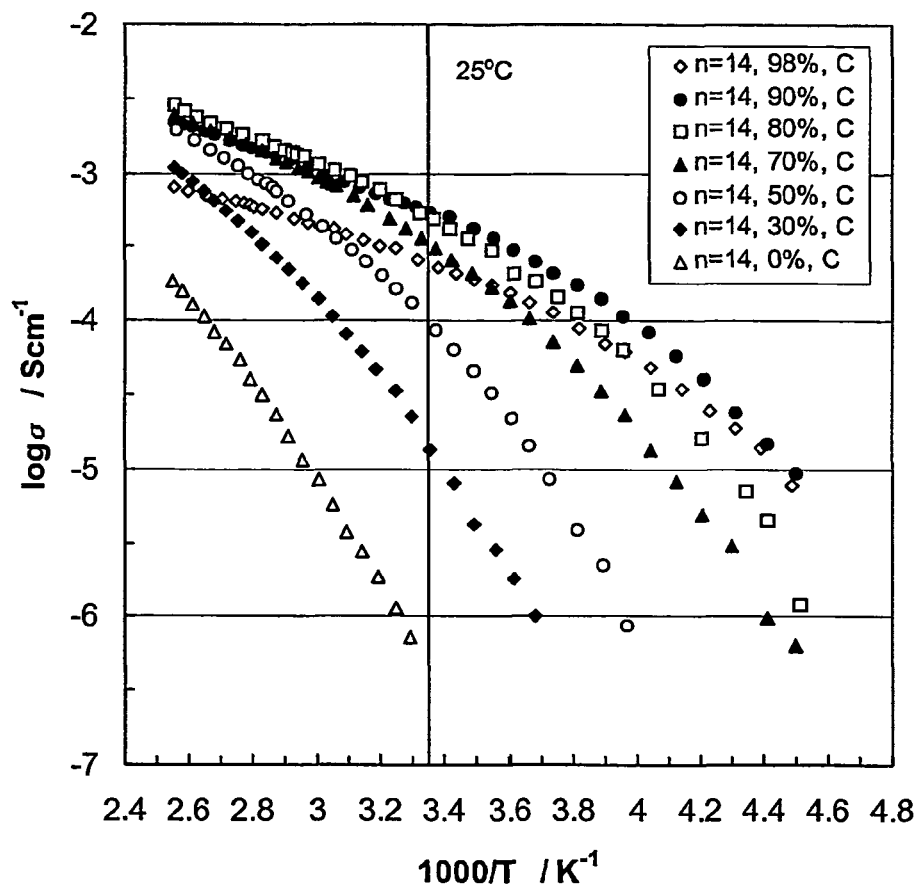
Figure 8C. Temperature dependence of ionic conductivity of EC-PC (1:1 by wt) plasticized LiBH$_4$-crosslinked P(LiOEG$_{14}$B) with different content of plasticizer.

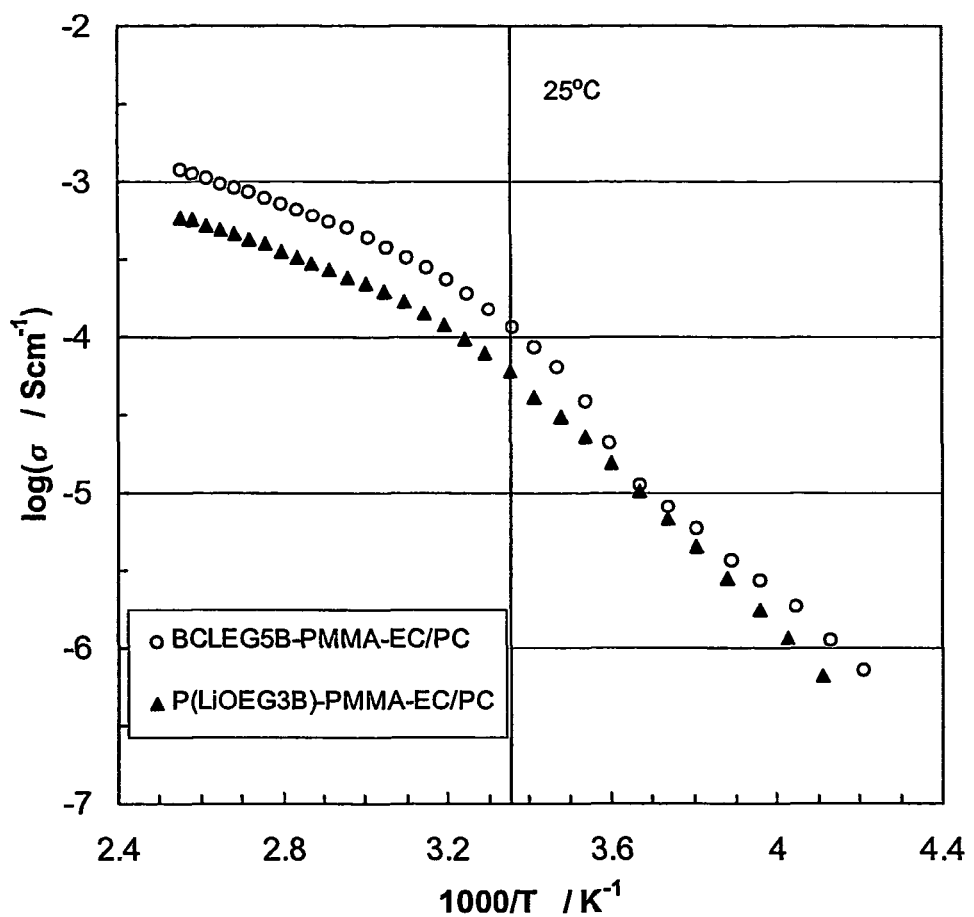
Figure 9. Temperature dependence of ionic conductivities of two gel electrolytes with composition of 20.92 PPMA-8.09 P(LiOEG3B)-35.45 EC-35.44 PC (Example 8), and 21.05 PMMA-7.91 BCLEG5B-35.53 EC-35.52 PC (Example 9), respectively.

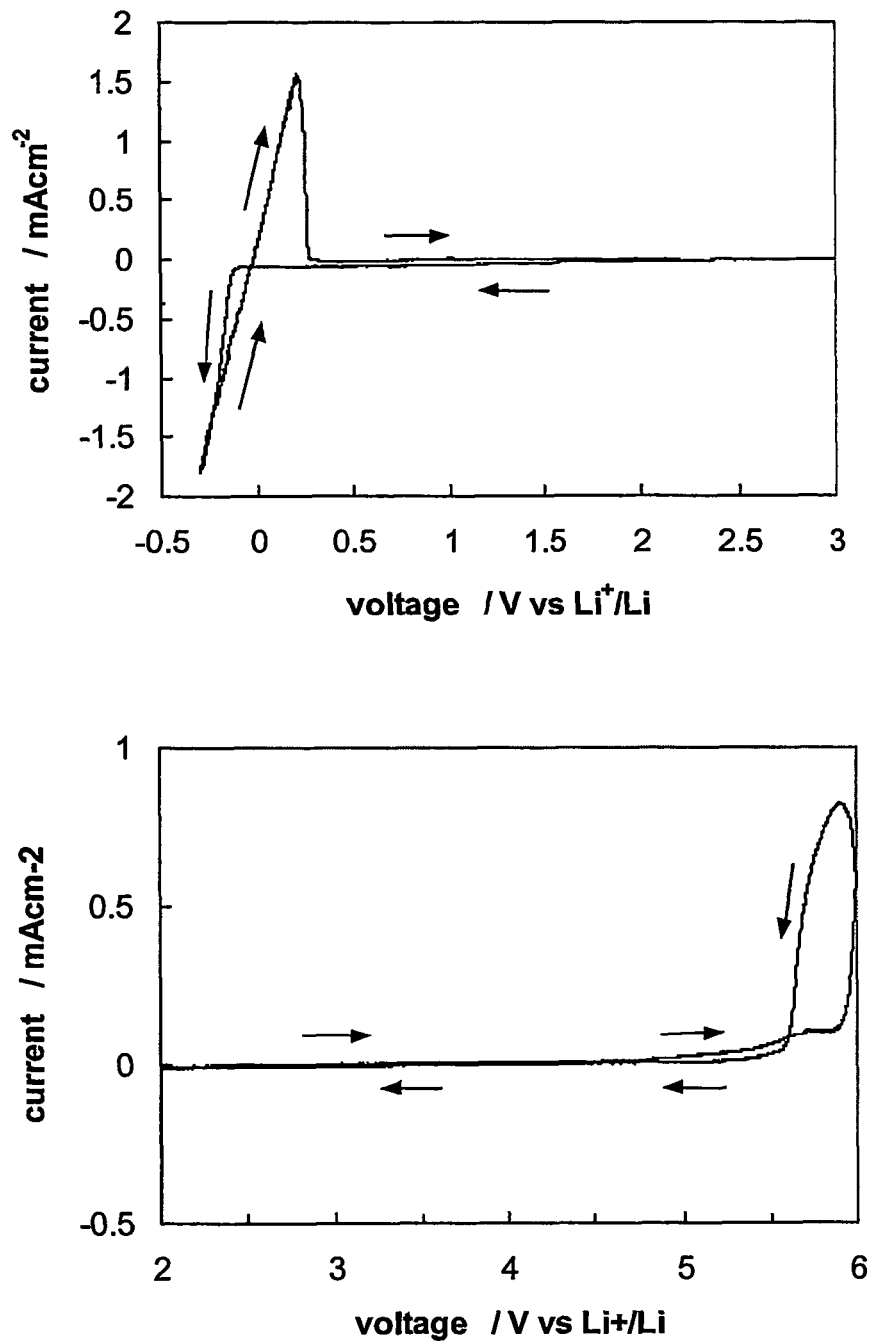
Figure 10A. Lithium deposition-stripping process and electrochemical oxidation of 80% EC-PC plasticized P(LiOEG$_3$B) on stainless steel electrode, at a scan rate of 1 mVs$^{-1}$ at room temperature. SS area = 1.963 × 10$^{-3}$ cm$^2$.

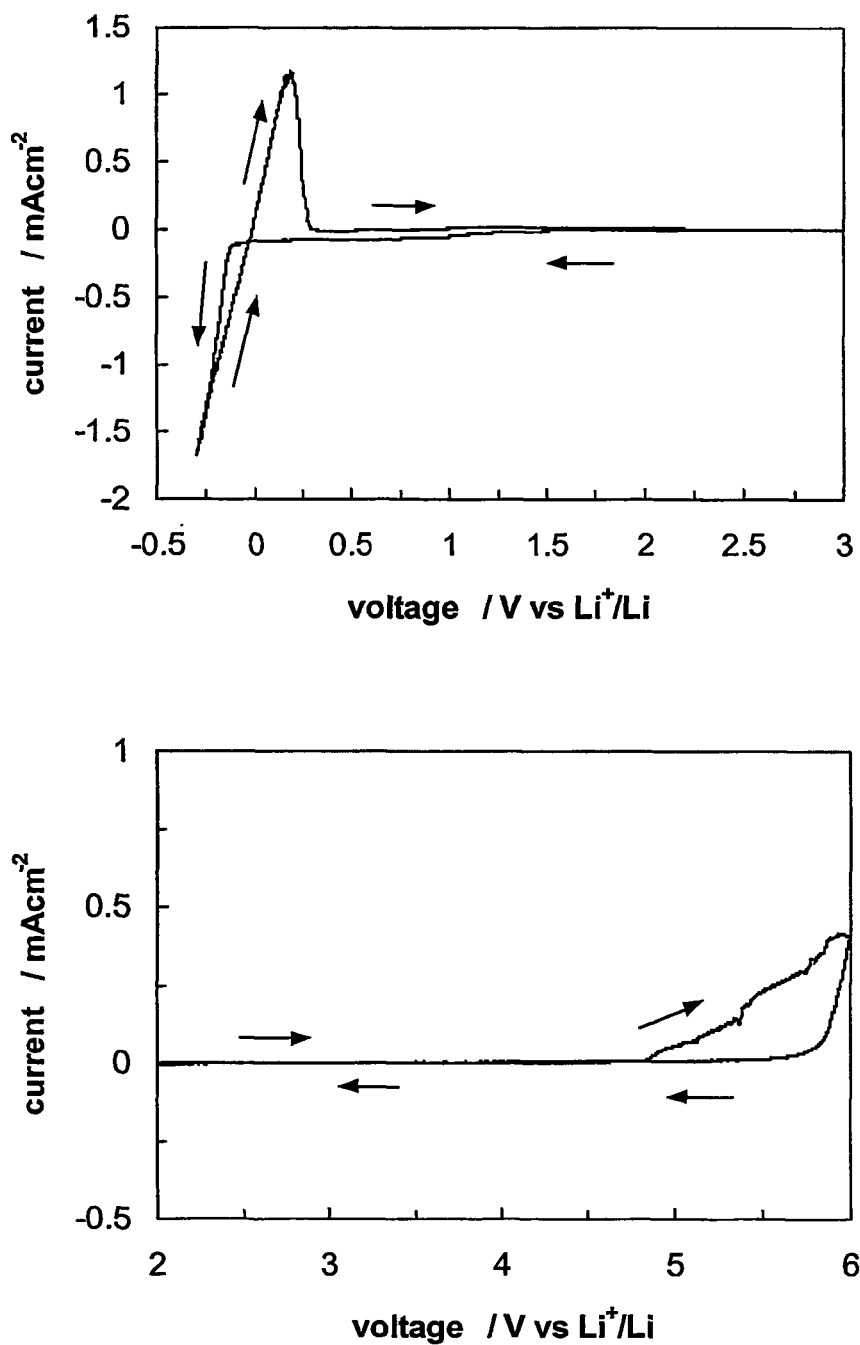
Figure 10B. Lithium deposition-stripping process and electrochemical oxidation of 80% EC-PC plasticized P(LiOEG$_3$B) on nickel electrode, at a scan rate of 1 mVs$^{-1}$ at room temperature. Ni area = 1.963 × 10$^{-3}$ cm$^2$.

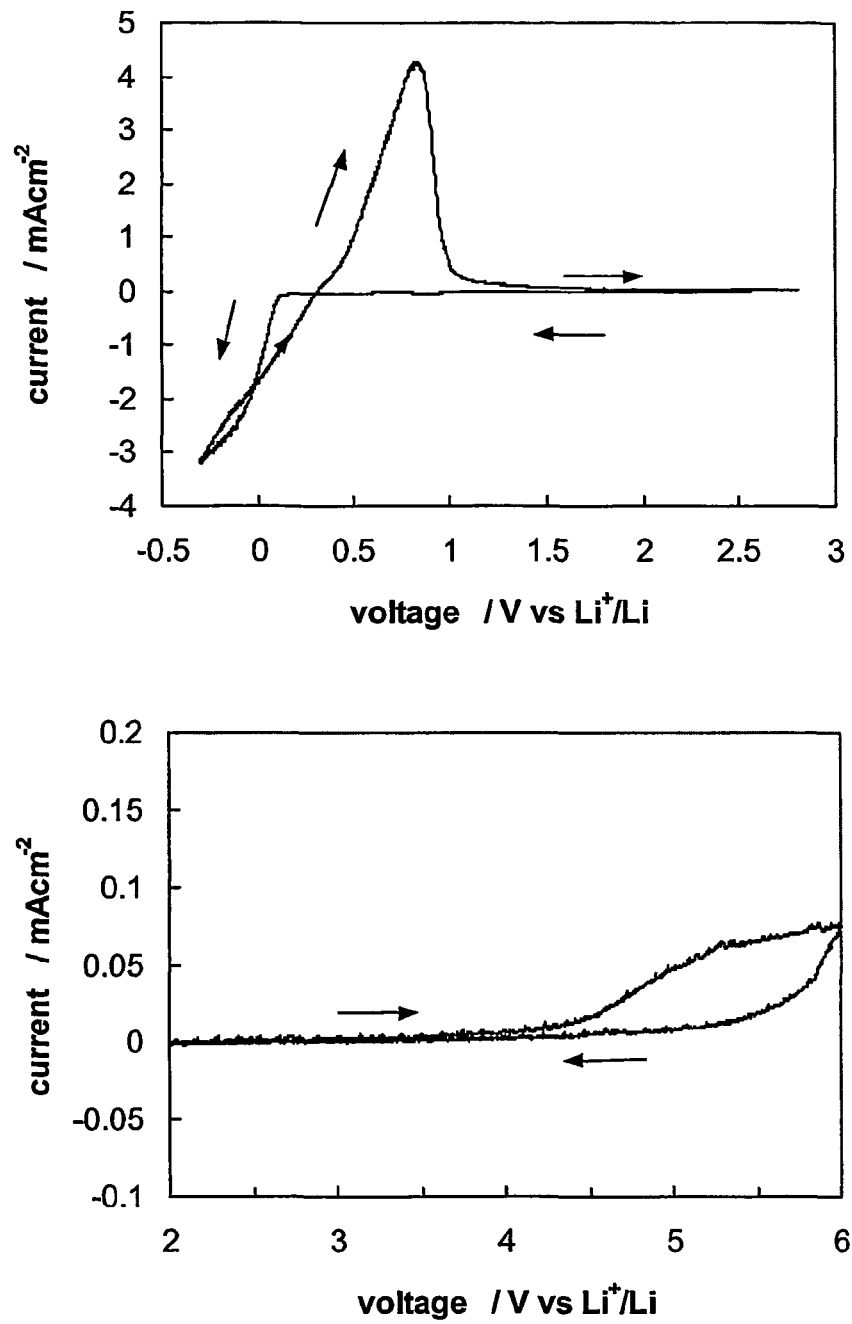
Figure 10C. Lithium deposition-stripping process and electrochemical oxidation of 80% EC-PC plasticized P(LiOEG$_3$B) on aluminum electrode, at a scan rate of 1 mVs$^{-1}$ at room temperature. Al area = 1.963 × 10$^{-3}$ cm$^2$.

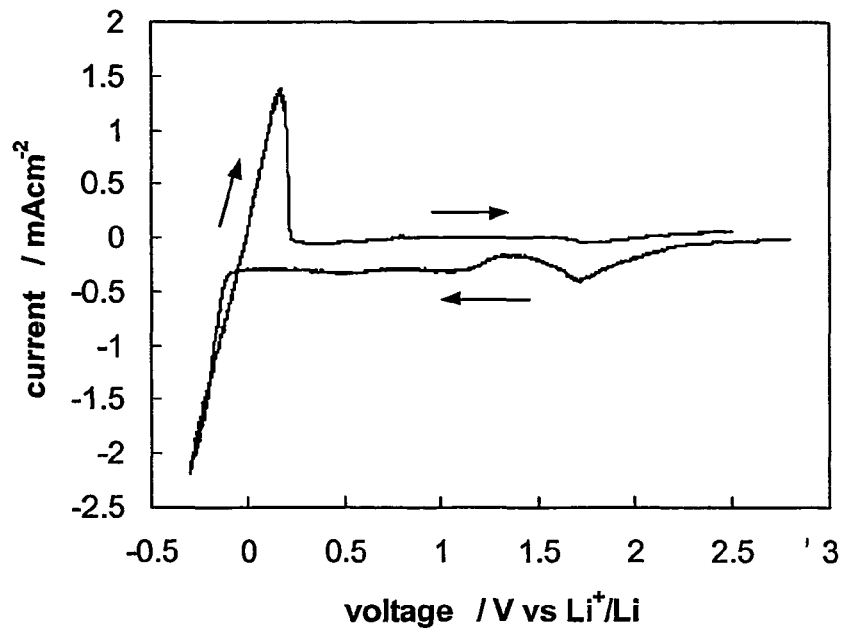
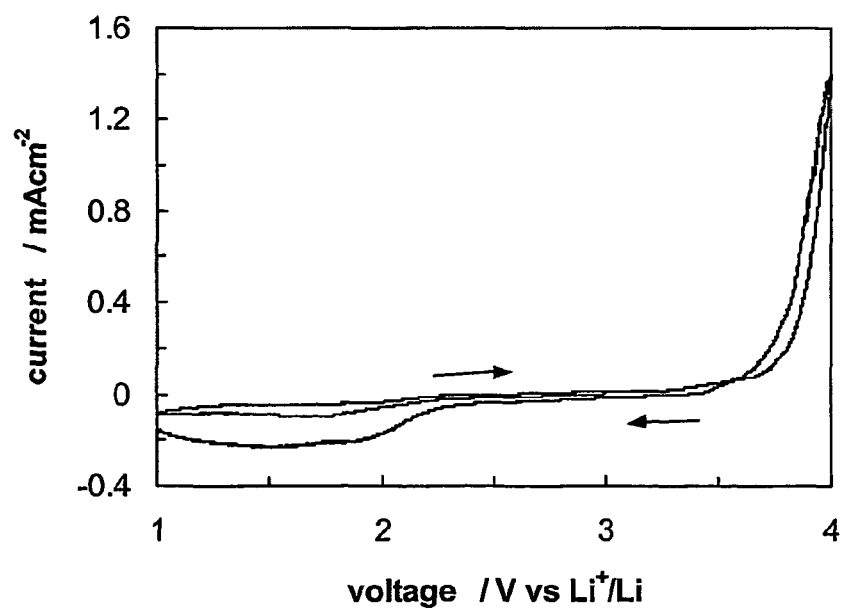
Figure 10D. Lithium deposition-stripping process and electrochemical oxidation of 80% EC-PC plasticized P(LiOEG$_3$B) on copper electrode, at a scan rate of 1 mVs$^{-1}$ at room temperature. Cu area = 1.963 × 10$^{-3}$ cm$^2$.

CONDUCTIVE POLYMERIC COMPOSITIONS FOR LITHIUM BATTERIES

CROSS REFERENCE TO RELATED APPLICATIONS

This application is a national stage application of and claims the benefit of PCT Application No. PCT/US01/41009 filed on Jun. 16, 2001, published as WO 01/96446, which claims priority to U.S. Provisional Patent Application Ser. No. 60/212,231, filed Jun. 16, 2000 and U.S. Provisional Patent Application Ser. No. 60/290,864 filed May 14, 2001, all of which are hereby incorporated by reference herein.

Financial assistance for this project was provided by the U.S. Government through the National Science Foundation under Grant No. CHE-9808678 and the Department of Energy under Grant Nos. DEFG0393ER14378-003 and DEFG0395ER45541. Therefore, the United States Government may own certain rights to this invention.

INTRODUCTION

1. Technical Field

The present invention relates to novel highly conductive polyanionic polymers suitable for use in solid polymeric electrolytes in lithium batteries, especially secondary lithium batteries.

2. Background

Lithium batteries supply energy to a growing number of portable electrochemical devices and are a promising energy source for larger applications such as electric automobiles. Accordingly, lithium batteries are the subject of intense research and the effort to improve performance continues.

A major area of interest has been in the field of electrolytes for lithium cells where high conductivity and transport number for lithium ion has been the goal. Electrolytes are generally prepared by dissolving a highly-conductive salt in a polymer, usually an ether polymer, to make solid polymeric electrolytes (SPE). Examples of the "salt-in-polymer" approach include the electrolytes disclosed in U.S. Pat. Nos. 5,849,432, 5,824,433, 5,660,947, and 6,235,433.

A "polymer-in-salt" approach has also been attempted. In this approach, chain polymers are added as a dilute component to impart solidity to molten alkali metal salt mixtures of high conductivity (1). Unfortunately, it has been difficult to find simple salts of lithium that are stable and liquid at room temperature. Examples of the polymer-in-salt approach include U.S. Pat. Nos. 5,962,169, 5,855,809, 5,786,110, 5,506,073 and 5,484,670.

Investigations of weakly coordinating anion groups continue to spur the development of new polymeric materials suitable for inclusion into SPE. Fujinami et al. in U.S. Pat. No. 6,210,838, disclose a Lewis acid, the weakly coordinating boroxine ring in a polymeric ether chain. Good conductivities are achieved by adding a salt to the polymer. Although the polymer appears to have good mechanical properties, the reported conductivity is too low for commercial applications. Strauss et al. in U.S. Pat. No. 6,221,941 disclose weakly coordinating polyfluoroalkoxide anions for applications in electrochemical devices. A highly conductive salt, bis(oxalato)borate, has recently been discovered (German patent No. DE 19829030) and its potential as a SPE is being studied. (6).

The need for conductive polymers continues to spur the development of new materials. Polymeric films which contain weakly coordinating anionic groups are promising candidates as SPE, as they would have good decoupling characteristics and thus high transport number for cations. Batteries and other ionic devices could be made much smaller and lighter by exploiting these films. (2).

Despite continuing discoveries of highly conductive electrolytic salts, and advances in polymerizing these salts, solid polymer electrolytes for lithium batteries are still needed. Especially sought are weakly coordinating anionic materials that can be fabricated into films with high conductivity.

3. Relevant Literature

1. C. A. Angell, K. Xu, S. S. Zhang and M. Videa, "Variations on the Salt-Polymer Electrolyte Theme for Flexible Solid Electrolytes", Solid State Ionics, 86-88, 17-28 (1996).

2. C. A. Angell, C. Liu and G. Sanchey, "Rubbery Solid Electrolytes with Dominant Catronic Transport and High Ambient Conductivity", Nature, 362, 137-139, Mar. 11, 1993.

3. J. R. MacCallum and C. A. Vincent (Eds.), Polymer Electrolytes Reviews, Vol. 1, Elsevier, London, 1987.

4. H. Ohno, "Molten Salt Type Polymer Electrolytes", Electrochimica Acta, 46, 1407-1411 (2001).

5. S. S. Zhang, Z. Chang, K. Xu and C. A. Angell, "Molecular and Anionic Polymer System with Micro-Decoupled Conductivities", Electrochimica Acta, 45, 12-29 (2000).

6. W. Xu, and C. A. Angell, *Electrochem. and Solid State Lett.*, 4, E1 (2001).

SUMMARY OF THE INVENTION

It has been discovered that certain anionic groups may be readily bound into chain polymers to make conductive solid polymers. The novel polymers comprise repeat units of weakly coordinating anions in a polyether backbone at separations determined by the number and nature of repeating spacer groups in the polymer chains. The repeating spacer groups also determine the physical characteristics of the polymer including glass transition temperature and mechanical properties such as flexibility, shear strength and solubility.

A method for preparing the subject polymers is provided. In the method the anionic component of certain electrolytic salts comprising a Group III element, preferably orthoborate is modified by chelation with a capping group to make weakly coordinating anionic moieties when incorporated into the polymeric chains. This property makes them suitable for use as solid polymeric electrolytes (SPE) in lithium batteries In an important aspect of the invention, certain modifications of the polyanionic polymers, plasticization and cross-linking, e.g., are provided to enhance the conductivity and optimize certain physical properties of the polymers. The modified polymers may be formed into films, coatings and extruded into solid forms for use in electrochemical devices and especially in lithium batteries and rechargeable lithium batteries.

BRIEF DESCRIPTION OF THE FIGURES

FIG. 1 illustrates temperature dependence of ionic conductivities of PEG-spaced polyMOBs, $P(LiOEG_nB)$, where the length of spacer $EG_n$ is 3 to 23.

FIG. 2 illustrates temperature dependence of ionic conductivities of PPG-spaced polyMOBs, $P(LiOPG_nB)$, where the length of spacer $PG_n$ is 7 to 17.

FIG. 3 illustrates temperature dependence of ionic conductivities of PEG-spaced polyMMBs, $P(LiMEG_nB)$, where the length of spacer $EG_n$ is 5 and 14.

FIG. 4 illustrates temperature dependence of ionic conductivities of $LiBH_4$ crosslinked PEG-spaced polyMOBs, $BCLEG_nB$, where the length of spacer $EG_n$ is 5 to 14.

FIG. 5A illustrates temperature dependence of ionic conductivity of EC-PC (1:1) plasticized P(LiOEG$_3$B) with different EC-PC content.

FIG. 5B illustrates temperature dependence of ionic conductivity of EC-PC (1:1) plasticized P(LiOEG$_5$B) with different EC-PC content.

FIG. 5C illustrates temperature dependence of ionic conductivity of EC-PC (1:1) plasticized P(LiOEG$_9$B) with different EC-PC content.

FIG. 5D illustrates temperature dependence of ionic conductivity of EC-PC (1:1) plasticized P(LiOEG$_{14}$B) with different EC-PC content.

FIG. 6 illustrates temperature dependence of ionic conductivity of plasticized P(LiOEG$_5$B) by different EC-PC compositions.

FIG. 7 illustrates the room temperature conductivity of P(LiOEG$_3$B) plasticized by different solvents and solvent mixtures with the variation of lithium concentrations. Comparison is also made with the conductivity of simple LiBOB solutions in PC. Remembering that our conductivity is entirely due to Li$^+$cations, these results are seen as highly promising.

FIG. 8A illustrates temperature dependence of ionic conductivity of EC-PC (1:1 by wt) plasticized LiBH$_4$-crosslinked P(LiOEG$_5$B) with different content of plasticizer.

FIG. 8B illustrates temperature dependence of ionic conductivity of EC-PC (1:1 by wt) plasticized LiBH$_4$-crosslinked P(LiOEG$_9$B) with different content of plasticizer.

FIG. 8C illustrates temperature dependence of ionic conductivity of EC-PC (1:1 by wt) plasticized LiBH$_4$-crosslinked P(LiOEG$_{14}$B) with different content of plasticizer.

FIG. 9 illustrates temperature dependence of ionic conductivities of two gel electrolytes with composition of 20.92 PPMA-8.09 P(LiOEG3B)-35.45 EC-35.44 PC (Example 8), and 21.05 PMMA-7.91 BCLEG5B-35.53 EC-35.52 PC (Example 9), respectively.

FIG. 10A illustrates lithium deposition-stripping process and electrochemical oxidation of 80% EC-PC plasticized P(LiOEG$_3$B) on stainless steel electrode, at a scan rate of 1 mVs$^{-1}$ at room temperature. SS area=1.963×10$^{-3}$ cm$^2$.

FIG. 10B illustrates lithium deposition-stripping process and electrochemical oxidation of 80% EC-PC plasticized P(LiOEG$_3$B) on nickel electrode, at a scan rate of 1 mVs$^{-1}$ at room temperature. Ni area=1.963×10$^{-3}$ cm$^2$.

FIG. 10C illustrates lithium deposition-stripping process and electrochemical oxidation of 80% EC-PC plasticized P(LiOEG$_3$B) on aluminum electrode, at a scan rate of 1 mVs$^{-1}$ at room temperature. Al area=1.963×10$^{-3}$ cm$^2$.

FIG. 10D illustrates lithium deposition-stripping process and electrochemical oxidation of 80% EC-PC plasticized P(LiOEG$_3$B) on copper electrode, at a scan rate of 1 mVs$^{-1}$ at room temperature. Cu area=1.963×10$^{-3}$ cm$^2$.

DETAILED DESCRIPTION OF THE PREFERRED EMBODIMENTS

It has been discovered that certain anionic groups may be readily bound into chain polymers to make conductive solid polymers. The novel polymers and their formulations are provided wherein the polymeric compositions comprise repeat units of weakly coordinating anions positioned between polymer chains comprising repeating spacer groups.

The weakly coordinating anions will, for the most part, be tetra-coordinated members of the Group III elements, preferably tetra-coordinated boron and most preferably orthoborate, substituted with appropriate chelating groups for providing the desired weakly coordinating characteristics of the resulting anionic moiety. The chelating groups bind two oxygen members of the orthoborate anion, thus leaving two oxygens free for binding into the polymeric chains. Preferred chelating groups are dibasic acid residues, most preferably oxalato, malonato or succinato. Certain other preferred chelating groups 1,2,tetra(trifluoromethyl) ethylenedialato, aryl, phenyl and R-substituted phenyl wherein R is alkyl or halo, SO$_2$ and silane-co-tetraethylene glycalato[DMSI]. The chelating group may be a bi-dentate group or may be two monodentate groups.

To space the repeating anions in the polymer chain, the repeating spacer groups are chosen to have a length and structure required to achieve the desired separation. Most generally, the spacer groups are polyethers, which may be the same or different in each occurrence. Certain preferred polyethers are poly(ethylene glycol), (hereinafter termed PEG), or poly(propylene glycol), (hereinafter termed PPG), of different molecular weights. Certain other spacer groups are siloxanes.

Certain physical characteristics are also determined by choice of repeating spacer groups in the polymer. Glass transition temperature and mechanical properties such as flexibility, shear strength and solubility are affected by the nature of the repeating spacer groups. At room temperature, for example, the PEG-spaced polymers are almost glassy for short spacer units, e.g. when tri(ethylene glycol) (n=3) is used in the polymerization. They are almost rubbery (very slowly flowing at high temperatures, but rubbery for short time stresses) when PEG200 (n≈5) is used in the polymerization, and soft or sticky rubbery when PEG400 (n≈9) and PEG600 (n≈14) are used in the polymerization. The polymer from PEG1000 (n≈23) is partly crystallized (the polyether segment) at room temperature. The three PPG-spaced polymers are all highly viscous liquids. The polymers are soluble in various polar solvents, like acetonitrile, acetone and even chloroform. Slow hydrolysis and alcoholysis of the polymers take place on prolonged exposure to water or alcohols. However, the reaction products are benign.

The choice of spacer group also determines the conductivity of the polyanionic polymers. FIG. 1 and FIG. 2 show the temperature dependence of ionic conductivity of PEG and PPG spaced polyanionic electrolytes measured during steady cooling, before (B) and after (A) chloroform treatment to remove LIBOB. The conductivities of these polymeric forms are strongly dependent on the length of the PEG or PPG spacer between the anionic groups, which can be characterized by the number of ethyleneoxy or propyleneoxy units, n value. The actual separation of anions depends on chain conformations. For equal n value, PPG-spaced polymers are distinctly less conducting than PEG-spaced polymers.

A method for preparing the subject polymers is provided. In the method, the anionic component of certain electrolytic salts comprising a Group III element, preferably orthoborate is modified by chelation with a capping group to make weakly coordinating anionic groups. The anionic groups are then reacted with the polymer chains, preferably polyalkylene oxides comprising a terminal reactive group, preferably hydroxyl, under condensations whereby a condensation reaction occurs between the capped anionic group and the reactive group. The weakly coordinating polyanionic polymer and a small molecule result.

In the preferred method, an oxalato-capped orthoboric acid anion, B(C$_2$O$_4$)(OH)$_2^-$, is provided. A poly(aklylene glycol) is also provided. The capped orthoboric acid and the polyalkylene glycol are allowed to react to form a mono-oxalato orthoborate (a polyMOB" having the formula P(LiOEG$_n$B)

or P(LiOPG$_n$B), where EG represents ethylene glycol, PG represents propylene glycol and n represents the number of the spacer repeat units) eliminating water in a condensation polymerization process to provide the polymeric polyanion of whatever cation was used to charge-compensate the anion. Preferably the cation is monovalent and is lithium or sodium. In other instances, a malonato-capped orthoboric acid anion, B(CR$_2$C$_2$O$_4$)(OH)$_2^-$ wherein R is hydrogen or halo, preferably fluoro, is provided. In yet other instances the anion comprises a succinic acid residue of the formula B((CR$_2$)bC$_2$O$_4$)(OH)$_2^-$. In certain preferred instances the anion comprises 1,2-tetra(trifluoromethyl)ethylenedialato(2−)O,O' [OC(CF$_3$)$_2$]. This anion is disclosed in Xu, W. and Angell, C. A, Electrochim. And Solid-State Letters, 3 (8) 366-368 (2000) which is incorporated by reference. In certain other instances, the capping group is silane co-tetraethylene glycalato [DMSI].

The method may be illustrated by the following equations for the preparation of the lithium borate polymer of PEG:.

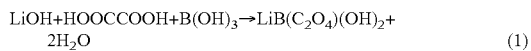  (1)

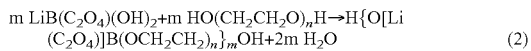  (2)

Certain by-products of these reactions may be separated from the desired polyanionic polymer by treatment with a suitable solvent such as acetonitrile or chloroform in which the by-products are poorly soluble. The glass transition temperatures, for example, before and after chloroform extraction are given in Table 1.

TABLE 1

DTA data for P(LiOEG$_n$B)s and P(LiOPG$_n$B)s before and after chloroform treatment to remove dissolved LiBOB

| Spacer | n value | Before CHCl$_3$ treatment | | | After CHCl$_3$ treatment | | |
|---|---|---|---|---|---|---|---|
| | | $T_g$ (° C.) | $T_c$ (° C.) | $T_l$ (° C.) | $T_g$ (° C.) | $T_c$ (° C.) | $T_l$ (° C.) |
| PEG | 3 | a | a | a | −0.9 | — | — |
| | 5 | −22.9 | — | — | −20.1 | — | — |
| | 9 | −41.8 | — | — | −44.3 | — | — |
| | 14 | −51.5 | −15.4 | 6.6 | −53.3 | −15.4 | 23.1 |
| | 23 | −54.5 | −2.3 | 20.6 | −63.1 | −47.2 | 39.7 |
| PPG | 7 | −43.3 | — | — | −47.0 | — | — |
| | 13 | −56.9 | — | — | −56.0 | — | — |
| | 17 | −63.4 | — | — | −61.0 | — | — | a: Not measured.

It may be seen that most of the polymers exhibit glass transitions in only the studied temperature range between −150 and 100° C. The glass transition temperature (T$_g$) decreases with increasing the spacer length for both types of spacers. Although it is not intended that the invention be bound by explanation of this behavior, it is thought that the effect of increasing spacer length is because the shorter spacer polymer has higher lithium ion concentration, raising the cohesive energy via transient crosslinking. Thus at ambient temperature the segmental mobility, and hence the Li$^+$ mobility increases with increasing the spacer length.

It may also be seen from Table 1 that the glass transition temperature has decreased after chloroform treatment in nearly every case. Apparently this is because the LiBOB content has been reduced and the number of transient crosslinking sites has decreased. However, the liquidus temperature for it n≈14 and n≈23 PEG spaced polymers increases relative to that before chloroform treatment. Clearly, therefore, the LiBOB is dissolved preferentially in the polyether chains domains and this has the usual melting point lowering effect. When the salt is removed the melting point goes up again.

The polyanionic polymers of the present invention have one of the formulae:

wherein

AL is a repeat unit in the chain wherein:

A is an anionic group comprising a Group III element.

The anionic groups are preferably orthoborate and are capped with a chemical group that modifies their anionic bonding strength. In certain preferred embodiments wherein the anionic group is an orthoborate, the capping groups bind pairwise to two oxygens of the orthoborate leaving two oxygens free to bind into the chain polymer units. The capping groups may be a divalent chelate group that binds both oxygens on the Lewis base or may be more than one group, each binding one oxygen.

The capping groups are preferably dibasic acids, most preferably oxalato or malonato groups In certain preferred instances the capping group is 1,2-tetra(trifluoromethyl)ethylenedialato(2−)O,O' [OC(CF$_3$)$_2$]. In certain other instances, the capping group is silane-co-tetraethylene glycalato [DMSI].

Certain other preferred capping groups are SO$_2$, aryl, phenyl and substituted phenyl L is a polymeric chain group chemically linked to A. and wherein L comprises a determined number of spacer groups and has the formula:

wherein

Z is a spacer group; and n is the number of each said spacer groups and wherein Z is the same or different in each occurrence; and Z is preferably chosen from the group comprising alkyl, R-substituted alkyl, alkoxy and R-substituted alkoxy wherein R is selected from the group comprising hydrogen, halo, alkyl, alkoxy, phenyl and substituted phenyl. In other instances, Z is a polysiloxane having the formula Si[(CR$_3$)$_2$]—O(CR$_2$CR$_2$O)$_n$ wherein n is independently 2 to about 50, preferably 2 to about 20, and R is hydrogen or alkyl.

Z most preferably is a polyether having the formula [(O(CR$_2$)$_a$CR$_2$]$_n$ wherein n is from 2 to about 100, most preferably 2 to about 20, a is zero to about 20 and R is hydrogen, halo, alkyl or R-substituted alkyl wherein R is halo, alkyl or phenyl.

p is a number from about 1 to about 100.

In these preferred embodiments the ether groups may be the same or different in each occurrence.

p is the number of repeat units in the polymer.

k is one to 3, most preferably one.

q is one to 3 bq equals bk.

In certain preferred embodiments of the present invention, the repeat group in the polyanionic polymer has one of the formulae:

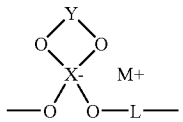

wherein X is a Group III element;
O are oxygen;
Y is a capping group.

The counterion $M^{+k}$ is a cation or a cationic group selected from the group comprising hydrogen, Group I metals, Group II metals, $NR_4$ and $PR_4$ wherein R is hydrogen, alkyl, or halo, and k is one to three. In certain instances wherein the polyanionic polymer is used as an electrolyte in a lithium battery, the counterion is most favorably lithium. In those embodiments wherein the polyanionic polymer is incorporated into an ion exchange system, the cation is preferably a Group I metal or Group II metal, most preferably sodium, potassium, and calcium It will be appreciated that a molar ratio of a cation to an anion in the polymer of the present invention depends on the valence of the cation and the valence on the anion as well as the number of anionic groups in the polymer. If the total charge on the polymer is k, the ration is reflected in the value of p and k. For example, if both the cation and the anion are monovalent, then k and p are 1, and there will be a 1:1 molar ratio between the cation and the anionic group. Whereas if the cation is divalent and the anion is monovalent, then k is 2 and p is 1, and there will be a 1:2 molar ratio between the cation and the anionic group of the present invention. Preferably, k is an integer from 1 to 3, more preferably 1 to 2, still more preferably k is 1 or 2, and most preferably 1. Preferably p is 1 or 2 and most preferably 1.

The weak charge on the anionic compound acts as a coulombic trap for $M^{+p}$ and as a result, $M^{+p}$ is easily decoupled from the anionic polymer. This decoupling property imparts high cationic conductivity to the polymer and makes the polymers useful as solid polymeric electrolytes in lithium batteries. In certain instances wherein the polyanionic polymer is incorporated into a lithium battery, the counterion is lithium. In those embodiments wherein the polyanionic polymer comprises an ion exchange system, the cation is preferably a Group I metal or Group II metal, most preferably sodium, potassium, calcium.

Preferred methods for preparing the present polymers comprises providing a precursor anionic group wherein the anionic group comprises a Group III element tetragonally coordinated with oxygen and wherein two of the oxygens are capped with an electron withdrawing group. Also provided is a polymeric group comprising repeating spacer groups and having a reactive group. The anionic group and the polymeric group are combined to form the polyanionic polymer and a small molecule. In preferred embodiments wherein the anionic group comprises a tetra-coordinated oxide of a Group III element wherein two oxygens are capped and two oxygens are coordinated to hydrogen or a cation, the reactive group condenses with the uncapped oxygen and a small molecule such as water or a hydroxide is formed.

The present invention further relates to solid polymeric electrolytes incorporating such polymers and to rechargeable batteries and other electrochemical devices which utilize solid polymeric electrolytes.

Certain modifications can be made to the present conductive polymers to enhance their mechanical properties so they can be more readily formed into films or otherwise fabricated into components suitable for use in secondary lithium batteries. Certain properties of the present polymers indicate their suitability for such purposes. They are soluble in certain solvents and plasticizers, which is a prerequisite for film formation. They may be cross-linked to form polyanionic composites, and these cross-linked composites are likewise soluble or swollen in plasticizers. The polymeric chains in the present polymers may be chosen to be reactive with other polymers so that they may be mixed with, bonded to, or otherwise incorporated into suitable non-ionic chain polymers, ionic chain polymers comprising other ionic groups, polymer networks or block-co-polymers. These modifications have been illustrated in the following examples. Certain similar modifications will be apparent to one skilled in the polymer arts.

In an important aspect of the present invention, the polyanionic chain polymers are cross-linked to form a polyanionic polymeric network. Any suitable cross-linking agent may be used, but most preferably the string polymers are chemically crosslinked with lithium boron hydride. Cross-linked polymers exhibit greater mechanical strength than the simple polymer chains.

In yet a further important aspect of the present invention, the polyanionic chain polymers are dissolved in solvents, preferably polar solvents, for example tetralydrofuran (THF), acetonitrile and acetone. This advantageous property of the polyanionic polymers of the present invention makes them suitable for fabrication into films and coatings.

In a related aspect of the present invention, the polyanionic chain polymers incorporating weakly coordination anionic groups may be affixed to a solid surface and incorporated into an ion-exchange system. The spacer groups may be chosen to provide a tethering group for bonding to a surface such as an ion exchange resin bead or a porous membrane.

In yet another aspect of the present invention, a method is given for increasing the conductivity of the polyanionic polymers wherein certain plasticizers are added to the polymers. Although it is not intended that the present invention be bound by a description of the mechanism of the plasticization effect, it is proposed that the local mobility of the polymeric chain is increased by the plasticizers and as a result the conductivity is increased.

In an advantageous embodiment of the invention, the anionic chain polymers and the cross-linked network polymers comprise certain plasticizers that enhance the conductivity of the polymer. The plasticized polymers and cross-linked polymers can be formed into conductive films by methods known in the art. Preferred plasticizers are carbonate and non-carbonate plasticizers. Suitable carbonate plasticizers are, for example, ethylene carbonate (EC), propylene carbonate (PC), butylene carbonate (BC), dimethylcarbonate (DMC) and diethyl carbonate (DEC). Suitable non-carbonate plasticizers are 1,2-dimethoxyethane (DME) and 1,2-diethoxyethane (DEE), dimethylsulfoxide (MSO), dimethylsulfone (DMS), ethylmethylsulfone (EMS), γ-butyrolactone (BL). Preferred plasticizers comprise mixtures of carbonate plasticizer, preferably mixtures of ethylene carbonate and propylene carbonate (EC-PC), ethylene carbonate and dimethyl carbonate (EC-DMC), and propylene carbonate and dimethylxyethane (PC-DME).

The above-mentioned polyanionic polymers and cross-linked polymers and those embodiments wherein the polymers are dissolved in solvents or comprise plasticizers can be employed advantageously as solid polymeric electrolytes in most any type of electrochemical device. Most specifically the polyanionic polymers of the present invention are suitable SPE for electrochemical devices comprising lithium and in particular, lithium rechargeable batteries. The polyanionic polymers can be incorporated in electrochemical cells and lithium batteries, especially rechargeable lithium batteries.

These and other features, aspects and advantages of the present invention will become better understood with reference to the following description, and accompanying drawings.

EXAMPLE 1

This example illustrates the preparation of a Lewis base-containing polyanionic polymer wherein the Lewis base comprises a tetrakis-coordinated boron structure wherein two ligands are connected with an oxalyl groups and the other two ligands are oxygen linked to the polymeric chain containing repeating spacer units of ethylene glycol. This polymer is generally called polyMOB (wherein "MOB" is for mono-oxalato borate) and has the formula poly[lithium mono-oxalato oligo(ethylene glycol)$_n$ borate] which termed P(Li-OEG$_n$B) wherein n is 3 to 23.

The route to the polyanion polymers is to first form the oxalato-capped orthoboric acid $B(C_2O_4)(OH)_2^-$ and then to react this compound with poly(ethylene glycol), PEG, of different molecular weight, eliminating water in a condensation polymerization process to provide the polyanion of whatever cation was used to charge-compensate the anion.

In practice, equal molar quantities of lithium hydroxide monohydrate, oxalic acid dihydrate and boric acid were reacted and all the water was removed by boiling. The solid oxalatoboric acid residue was then refluxed with PEG, chosen from tri(ethylene glycol), PEG200, PEG400, PEG600 and PEG1000, in benzene in a distillation flask equipped with a water separator. The reaction continued until no more water was released. This procedure yielded a rubbery polymer with some fine white particles inside the polymer. The polymer is insoluble in benzene. The supernatant solvent (benzene) was decanted and the residue was washed with fresh benzene once and then evaporated on a rotary evaporator under reduced pressure to obtain a dry gel-like residue. This mass was refluxed with anhydrous acetonitrile to yield a clear solution with white precipitates. The precipitates were filtered off and the solvent in the filtrate was evaporated thoroughly. Then the residual rubbery solid was dissolved in anhydrous chloroform to yield a clear solution with small amount of a white precipitate. After filtration, the filtrate was evaporated down and the polymer was dried in a vacuum oven at 90° C. for 48 hours. The products were rubbery, soft or sticky rubbery, or crystal solid, depending on the PEG used. The ionic conductivities of the PEG-spaced polyMOBs are shown in FIG. 1.

EXAMPLE 2

This example illustrates the preparation of a Lewis base-containing polyanionic polymer wherein the Lewis base comprises a tetrakis-coordinated boron structure wherein two ligands are connected with an oxalyl groups and the other two ligands are oxygen linked to the polymeric chain containing repeating spacer units of propylene glycol. This polymer is generally called polyMOB (wherein "MOB" is for mono-oxalato borate) and has the formula poly[lithium mono-oxalato oligo(propylene glycol)$_n$ borate] which termed P(Li-OPG$_n$B) wherein n is 7, 13 and 17.

The white product of lithium hydroxide monohydrate, oxalic acid dihydrate and boric acid was refluxed with PPG, chosen from PPG425, PPG725 and PPG1000, in benzene as described in Example 1. The polymers were viscous liquid. The ionic conductivities of the PPG-spaced polyMOBs are shown in FIG. 2.

EXAMPLE 3

This example illustrates the preparation of a Lewis base-containing polyanionic polymer wherein the Lewis base comprises a tetrakis-coordinated boron structure wherein two ligands are connected with an oxalyl groups and the other two ligands are oxygen bound to dimethyl siloxane-co-tetraethylene glycol. This polymer is generally called polyMOB (wherein "MOB" is for mono-oxalato borate) and has the formula poly[lithium mono-oxalato oligo(dimethyl siloxane-co-tetraethylene glycolato)$_n$, borate] herein abbreviated as P[LiO(DMSiEG$_4$)$_n$B] wherein n is around 12.

To a flame dried 500 ml three-neck flask equipped with condenser, thermometer and dropping funnel was added 23.9 g (0.123 mole) tetraethylene glycol. The flask was heated to 100° C. and 18.0 g (0.123 mole) bis(dimethylamino)dimethyl silane was added dropwise under vigorous stirring. After the addition the reaction was continued at the same temperature while a lot of gas (dimethylamine) was bubbling out of the solution. When the gas evolution nearly ceased (about 2 hours), 250 ml benzene was added to the reaction flask and followed by adding the product from the reaction of lithium hydroxide monohydrate, oxalic acid dihydrate and boric acid. The azeotropic distillation process was begun and the reaction was treated following the procedures described in Example 1. The polymer was sticky rubbery solid.

EXAMPLE 4

This example illustrates the preparation of a Lewis base-containing polyanionic polymer wherein the Lewis base comprises a tetrakis-coordinated boron structure wherein two ligands are connected with an malonyl groups and the other two ligands are oxygen linked to the polymeric chain containing repeating spacer units of ethylene glycol. This polymer is generally called polyMMB (wherein "MMB" is for mono-malonato borate) and has the formula poly[lithium mono-malonato oligo(ethylene glycol)$_n$ borate] which termed P(LiMEG$_n$B) wherein n is 5 to 23.

The white product from the reaction of lithium hydroxide monohydrate, malonic acid dihydrate and boric acid after evaporating all water was refluxed with PEG, chosen from PEG200, PEG400, PEG600 and PEG1000, in benzene as described in Example 1. The polymers were rubbery solid. The ionic conductivities of the PEG-spaced polyMMBs are shown in FIG. 3.

EXAMPLE 5

This example illustrates the preparation of a crosslinked polyanionic polymer from the Lewis base-containing polymers of Example 1. Lithium borohydride (LiBH$_4$) was used as the crosslinker.

Polymers from Example 1 (wherein the length of spacer groups was 5 to 14) was dissolved in anhydrous THF and cooled in acetone-dry ice bath. Certain amount of LiBH$_4$ in THF solution was dropwise added into the above solution with vigorous stirring. After addition, the solution was stirred at room temperature overnight. The solvent was then evaporated at reduced pressure and the residual polymer was dried in a vacuum oven at ca. 70° C. for 48 hours. The product was stiff rubber and soft rubber depending on the length of the spacer. The temperature dependence of ionic conductivity of these crosslinked polyanionic electrolytes are shown in FIG. 4.

EXAMPLE 6

This example illustrates the plasticization of a polyanionic polymer prepared in Example 1, in non-aqueous solvents. The non-aqueous solvent is chosen from carbonate, non-carbonate plasticizers or their mixtures. Suitable carbonate plasticizers are, for example, ethylene carbonate (EC), propylene carbonate (PC), butylene carbonate (BC), dimethyl carbonate (DMC) and diethyl carbonate (DEC). Suitable non-carbonate plasticizers are 1,2-dimethoxyethane (DME), 1,2-diethoxyethane (DEE), dimethylsulfoxide (DMSO), dimethyl sulfone (DMS), ethylmethylsulfone (EMS), γ-butyrolactone (BL). Preferred plasticizer mixtures are EC-PC, EC-DMC, EC-DMC-DEC, and PC-DME.

The polyanionic polymer from Example 1 wherein the length of the spacer $EG_n$, was 3 to 14 was mixed well with different amount of plasticizers or plasticizer mixtures. The conductivities of the plasticized electrolytes are given in FIGS. 5A to 5D, 6 and 7.

EXAMPLE 7

This example illustrates the plasticization of a crosslinked polyanionic polymer prepared in Example 5. The plasticizing effect was measured by using EC-PC (1:1, o/w) as the plasticizer.

The crosslinked polyanionic polymer from Example 5 wherein the length of the spacer $EG_n$ was 5 to 14 was mixed well with different amount of EC-PC (1:1, o/w). The conductivities of the plasticized electrolytes are given in FIGS. 8A, 8B and 8C.

EXAMPLE 8

This example illustrates the preparation of a gel electrolyte containing a Lewis base-containing polyanionic polymer prepared in Example 1 as a polymeric lithium salt.

In a dry glove box, the polyanionic polymer from Example 1 wherein the length of the $EG_n$ spacer was 3 was dissolved in a certain amount of EC-PC (1:1, o/w) mixture in a vial. A quantity poy(methyl methacrylate), PMMA, with high molecular weight of 996,000 was added. The vial was sealed and heated to around 140° C. with occasionally shaking till the mixture was well done. The hot viscous mass was pressed in between two stainless steel plates covered with Teflon films. After cooling, the self-standing membrane was pealed off. The conductivity of the gel electrolyte is given in FIG. 9.

EXAMPLE 9

This example illustrates the preparation of a gel electrolyte containing a crosslinked polyanionic polymer prepared in Example 5 as a polymeric lithium salt.

The gel electrolyte was prepared by dissolving PMMA and the crosslinked polyanionic polymer from Example 5 wherein the length of the $EG_n$, spacer was 3 in EC-PC (1:1, o/w) mixture in a vial, as described in Example 8. The conductivity of the gel electrolyte is given in FIG. 9.

EXAMPLE 10

This example illustrates the electrochemical properties of a plasticized polyanionic polymer prepared in Example 6. The cyclic voltammograms were measured at room temperature on an EG&G potentiostat/galvanostat model 273, with a three-electrode dip-cell with platinum, stainless steel, nickel, aluminum or copper wire as working electrode and lithium metal as counter and reference electrodes. The scan rate was 1 mVs$^{-1}$. The cyclic voltammetric results are given in FIGS. 10A to 10D.

EXAMPLE 11

This example illustrates the electrochemical properties of a plasticized crosslinked polyanionic polymer prepared in Example 5. The cyclic voltammograms maybe measured as described in Example 10.

EXAMPLE 12

This example illustrates the battery performance of an electrolytic solution containing a polyanionic polymer in EC/PC (1:1, o/w) mixture from Example 6, wherein the polyanionic polymer has the spacer length of 3 from Example 1. Prototype lithium rechargeable batteries were assembled by pressing into appropriate cases a sequence of a lithium metal disk anode, a glass fiber film soaked saturatedly with an electrolytic solution of a polyanionic polymer (wherein the length of the polyanionic polymer spacer from Example 1 was 3) in EC/PC (1:1, o/w) mixture from Example 6, and a composite cathode membrane. The latter was a blend of $LiCr_{0.015}Mn_{1.985}O_4$ as the active intercalation material, carbon black as an electronic conductor and PVdF as a polymer binder, in a weight ratio of 82:10:8. The batteries were assembled in a VAC dry box filled with purified argon. Preliminary investigation into the battery characteristics and performance was performed by examining their galvanostatic charge-discharge cyclic curves.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. An electrochemical cell having first and second terminals, comprising:

an electrolyte disposed between the first and second terminals for providing an electrical conduction path through the electrochemical cell, the electrolyte having a plurality of polyanionic polymer chains forming a solid polymer having a negatively charged surface, each polyanionic polymer chain having a formula:

$M_b^{+k}[AL]_p^{-q}$ wherein:
  AL is a repeat unit in the chain wherein AL includes the formula:

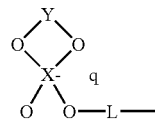

wherein X is a Group III element,
  O is oxygen,

Y includes a formula $OC(CR^1_2)_aCO$, $SO_2$, aryl, phenyl, and $R^1$-substituted phenyl, wherein a ranges from 0 to 5, $R^1$ is selected from the group consisting of alkyl 1,3 tetra (trifluoromethyl)ethylene dialato, halo 1,3 tetra (trifluoromethyl)ethylene dialato, and silane-co-tetraethyleneglycalato, L comprises n spacer groups z, and z is selected from the group consisting of alkyl, $R^2$-substituted alkyl, alkoxy, and $R^2$-substituted alkoxy, wherein $R^2$ is selected from the group consisting of hydrogen, halo, alkyl, alkoxy, phenyl, and substituted phenyl, and wherein n ranges from 1 to 30, and p is the number of repeating units in the polymer, q is charge on the anion, $M^+$ is a cation, b is the repeat number of compounds with a positive charge, k is the charge on the compound with a positive charge, and bk equals qp.

2. The electrochemical cell of claim 1, wherein p is a number from 1 to 3.

3. The electrochemical cell of claim 1, wherein the $M^{+k}$ is selected from the group consisting of hydrogen, Group I metals, Group II metals, $NR_4$ and $PR_4$, and wherein R is selected from the group consisting of hydrogen, alkyl, and halo, and wherein k ranges from 1 to 3.

4. The electrochemical cell of claim 1, wherein the repeating spacer groups include a polysiloxane having the formula $Si[(CR_3)_2]-O(CR_2CR_2O)]_w$, wherein w ranges from about 2 to 50, and wherein R is selected from the group consisting of hydrogen and alkyl.

5. The electrochemical cell of claim 1, wherein A comprises a borate anion having two oxygens bound to a dibasic acid residue and two oxygens bound to polymeric chain groups L, wherein the polymeric chain group L includes n spacer groups z, and spacer group z includes $[(CR^2_2)_x(CR^2_2O)]$, and wherein x ranges from 0 to 50.

6. The electrochemical cell of claim 1, wherein the polyanionic polymer chain is selected from the group consisting of poly[lithium oxalato oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

7. The electrochemical cell of claim 1, wherein the solid polymer further includes chemical bonds between polymer chains.

8. The electrochemical cell of claim 1, wherein the polyanionic polymer chain includes a plasticizer.

9. A battery electrolyte comprising:

a plurality of polyanionic polymer chains forming a solid polymer having a negatively charged surface, the polyanionic polymer chains having a formula:

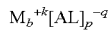

wherein:

AL is a repeat unit in the chain wherein:

A is an anionic group including a single bidentate group bonded to a Group III element through two oxygen atoms, L is a polymeric chain group chemically linked to A, the polymeric chain having repeating polyether spacer groups, the spacer groups providing distance between each anionic group, p is the number of repeating units in the polymer, q is charge on the anion, $M^+$ is a cation, b is the repeat number of compounds with a positive charge, k is the charge on the compound with a positive charge, and bk equals pq.

10. The electrolyte of claim 9, wherein AL of the polyanionic polymer chain includes the formula:

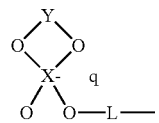

wherein X is a Group III element;

O is oxygen,

Y includes a formula $OC(CR^1_2)_aCO$, $SO_2$, aryl, phenyl, and $R^1$-substituted phenyl, wherein a ranges from 0 to 5, $R^1$ is selected from the group consisting of alkyl 1,3 tetra(trifluoromethyl)ethylene dialato, halo 1,3 tetra (trifluoromethyl)ethylene dialato, and silane-co-tetraethyleneglycalato, L comprises n spacer groups z, z is selected from the group consisting of alkyl, $R^2$-substituted alkyl, alkoxy and $R^2$-substituted alkoxy, wherein $R^2$ is selected from the group consisting of hydrogen, halo, alkyl, alkoxy, phenyl and substituted phenyl, wherein n ranges from about 1 to 30, and p is a number from 1 to 3.

11. The electrolyte of claim 9, wherein $M^{+k}$ is selected from the group consisting of hydrogen, Group I metals, Group II metals, $NR_4$ and $PR_4$, and wherein R is selected from the group consisting of hydrogen, alkyl, and halo, and wherein k ranges from 1 to 3.

12. The electrolyte of claim 9, wherein the repeating spacer groups include a polysiloxane having the formula $Si[(CR_3)_2]-O(CR_2CR_2O)]_n$, and wherein n ranges from about 2 to 50, and wherein R is selected from the group consisting of hydrogen and alkyl.

13. The electrolyte of claim 9, wherein A comprises a borate anion having two oxygens bound to a dibasic acid residue and two oxygens bound to polymeric chain groups L, and wherein the polymeric chain group L includes n spacer groups z, z includes $[(CR_2)_a(CR_2O)]n$, and wherein a ranges from about 0 to 50, and wherein R is selected from the group consisting of hydrogen, halo, hydroxyl, alkyl, alkenyl, alkoxy, phenyl and substituted phenyl, and wherein n ranges from about 1 to 30.

14. The electrolyte of claim 9, wherein polyanionic polymer chain is selected from the group consisting of poly [lithium oxalate oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

15. The electrolyte of claim 9, wherein the solid polymer further includes chemical bonds between the polymeric chains.

16. The electrolyte of claim 9, wherein the polyanionic polymer chain includes a plasticizer.

17. A battery electrolyte comprising:
a plurality of polyanionic polymer chains forming a solid polymer having a negatively charged surface, the polyanionic polymer chain having a formula $M_b^{+k}[AL]_p^{-q}$ wherein
AL is a repeat unit in the chain wherein:

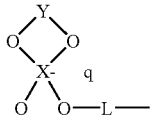

wherein X is a Group III element;
O is oxygen,
Y includes a formula $OC(CR^1_2)_aCO$, $SO_2$, aryl, phenyl, and $R^1$-substituted phenyl, wherein a ranges from 0 to 5,
$R^1$ is selected from the group consisting of alkyl 1,3 tetra(trifluoromethyl)ethylene dialato, halo 1,3 tetra(trifluoromethyl)ethylene dialato, and silane-co-tetraethyleneglycalato,
L comprises n spacer groups z, wherein z is selected from the group consisting of alkyl, $R^2$-substituted alkyl, alkoxy and $R^2$-substituted alkoxy,
wherein $R^2$ is selected from the group consisting of hydrogen, halo, alkyl, alkoxy, phenyl and substituted phenyl, wherein n ranges from about 1 to 30,
p is the number of repeating units in the polymer,
q is charge on the anion,
$M^+$ is a cation,
b is the repeat number of compounds with a positive charge,
k is the charge on the compound with a positive charge, and
bk equals pq.

18. The electrolyte of claim 17, wherein $M^{+k}$ is selected from the group consisting of hydrogen, Group I metals, Group II metals, $NR_4$ and $PR_4$, and wherein R is selected from the group consisting of hydrogen, alkyl, and halo, and k ranges from 1 to 3.

19. The electrolyte of claim 17, wherein the repeating spacer groups include a polysiloxane having the formula $Si[(CR_3)_2]—O(CR_2CR_2O)_w$, wherein w ranges from about 2 to 50, and wherein R is selected from the group consisting of hydrogen and alkyl.

20. The electrolyte of claim 17, wherein A comprises a borate anion having two oxygens bound to a dibasic acid residue and two oxygens bound to polymeric chain groups L, and wherein the polymeric chain group L includes n spacer groups z includes $[(CR^2_2)_x(CR^2_2O)]$, and wherein x ranges from about 0 to 50.

21. The electrolyte of claim 18, wherein polyanionic polymer chain is selected from the group consisting of poly [lithium oxalate oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

22. The electrolyte of claim 17, wherein the solid polymer further includes chemical bonds between the polymeric chain groups.

23. The electrolyte of claim 17, wherein the polyanionic polymer chain includes a plasticizer.

24. A method of producing a battery electrolyte comprising:
providing a plurality of polyanionic polymer chains forming a solid polymer having a negatively charged surface, the polyanionic polymer chains having a formula $M_b^{+k}[AL]_p^{-1}$ wherein
AL is a repeat unit in the chain wherein AL includes the formula:

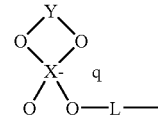

wherein X is a Group III element,
O is oxygen,
Y includes a formula $OC(CR^1_2)_aCO$, $SO_2$, aryl, phenyl, and $R^1$-substituted phenyl, wherein a ranges from 0 to 5,
$R^1$ is selected from the group consisting of alkyl 1,3 tetra(trifluoromethyl)ethylene dialato, halo 1,3 tetra (trifluoromethyl)ethylene dialato, and silane-co-tetraethyleneglycalato,
L comprises n spacer groups z, wherein z is selected from the group consisting of alkyl, $R^2$-substituted alkyl, alkoxy and $R^2$-substituted alkoxy,
wherein $R^2$ is selected from the group consisting of hydrogen, halo, alkyl, alkoxy, phenyl and substituted phenyl, wherein n ranges from about 1 to 30, and
p is the number of repeating units in the polymer,
q is charge on the anion,
$M^{30}$ is a cation,
b is the repeat number of compounds with a positive charge,
k is the charge on the compound with a positive charge, and
bk equals pq.

25. The method of claim 24, wherein
p is a number from 1 to 3.

26. The method of claim 24, wherein $M^{+k}$ is selected from the group consisting of hydrogen, Group I metals, Group II metals, $NR_4$ and $PR_4$, and wherein R is selected from the group consisting of hydrogen, alkyl, and halo, and wherein k ranges from 1 to 3.

27. The method of claim 24, wherein the repeating spacer groups include a polysiloxane having the formula $Si[(CR_3)_2]—O(CR_2CR_2O)_w$, and wherein w ranges from about 2 to 50, and wherein R is selected from the group consisting of hydrogen and alkyl.

28. The method of claim 24, wherein A comprises a borate anion having two oxygens bound to a dibasic acid residue and two oxygens bound to polymeric chain groups L, and wherein the polymeric chain group L includes n spacer groups z, and z includes $[(CR^2_2)_x(CR^2_2O)]$, and wherein x ranges from about 0 to 50.

29. The method of claim 24, wherein polyanionic polymer chain is selected from the group consisting of poly[lithium oxalato oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

30. The method of claim 24, wherein the solid polymer further includes chemical bonds between the polymeric chain groups.

31. The method of claim 24, wherein the polyanionic polymer chain includes a plasticizer.

32. The electrochemical cell of claim 1, wherein the spacer groups include polyether spacer groups.

33. The electrolyte of claim 17, wherein the spacer groups include polyether spacer groups.

34. The method of claim 24, wherein the spacer groups include polyether spacer groups.

35. An electrochemical cell, comprising:
first and second terminals that conduct electricity; and
an electrolyte disposed between the first and second terminals for providing an electrical conduction path through the electrochemical cell, the electrolyte comprising a plurality of polyanionic polymer chains forming a solid polymer having a negatively charged surface, the polyanionic polymer chains having a formula:

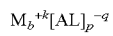

wherein:
AL is a repeat unit in the chain wherein
A is an anionic group including a single bidentate group bonded to a Group III element, through two oxygen atoms,
L is a polymeric chain group chemically linked to A, the polymeric chain having repeating polyether spacer groups, the spacer groups providing distance between each anionic group,
p is the number of repeating units in the polymer,
q is charge on the anion,
$M^+$ is a cation,
b is the repeat number of compounds with a positive charge,
k is the charge on the compound with a positive charge, and
bk equals qp.

36. The electrochemical cell of claim 35, wherein AL of the polyanionic polymer chain includes the formula:

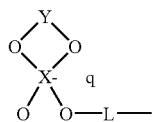

wherein X is a Group III element;
O is oxygen,
Y includes a formula $OC(CR^1{}_2)_aCO$, $SO_2$, aryl, phenyl, and $R^1$-substituted phenyl, wherein a ranges from 0 to 5,
$R^1$ is selected from the group consisting of alkyl 1,3 tetra(trifluoromethyl)ethylene dialato, halo 1,3 tetra (trifluoromethyl)ethylene dialato, and silane-co-tetraethyleneglycalato,
L comprises n spacer groups z, wherein z is selected from the group consisting of alkyl, $R^2$-substituted alkyl, alkoxy and $R^2$-substituted alkoxy,
wherein $R^2$ is selected from the group consisting of hydrogen, halo, alkyl, alkoxy, phenyl and substituted phenyl, wherein n ranges from about 1 to 30, and
p is a number from 1 to 3.

37. The electrochemical cell of claim 35, wherein the $M^{+k}$ is selected from the group consisting of hydrogen, Group I metals, Group II metals, $NR_4$ and $PR_4$ and wherein R is selected from the group consisting of hydrogen, alkyl, and halo, and wherein k ranges from 1 to 3.

38. The electrochemical cell of claim 35, wherein the repeating spacer groups include a polysiloxane having the formula $Si[(CR_3)_2]—O(CR_2CR_2O)]_n$, wherein n ranges from about 2 to 50, and wherein R is selected from the group consisting of hydrogen and alkyl.

39. The electrochemical cell of claim 35, wherein A comprises a borate anion having two oxygens bound to a dibasic acid residue and two oxygens bound to polymeric chain groups L, wherein the polymeric chain group L includes n spacer groups z,-and spacer group z includes $[(CR_2)_a (CR_2O)]n$, and wherein a ranges from 0 to 50, and wherein R is selected from the group consisting of hydrogen, halo, hydroxyl, alkyl, aklenyl, alkoxy, phenyl and substituted phenyl, and wherein n ranges from about 1 to 30.

40. The electrochemical cell of claim 35, wherein the polyanionic polymer chain is selected from the group consisting of poly[lithium oxalato oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

41. The electrochemical cell of claim 35, wherein the solid polymer further has chemical bonds between polymer chains.

42. The electrochemical cell of claim 35, wherein the polyanionic polymer chain includes a plasticizer.

43. A method of producing a battery electrolyte comprising:
providing a precursor anionic group wherein the anionic group comprises a Group III element tetragonally coordinated with oxygen, wherein two of the oxygens are capped with an electron withdrawing group;
providing a polymeric group comprising repeating spacer groups and a reactive group; and
combining the anionic group and the polymeric group to form polyanionic polymer chains forming a solid polymer electrolyte which includes a negatively charged surface, the polyanionic polymer chains having a formula:

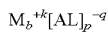

wherein:
AL is a repeat unit in the chain wherein
A is an anionic group including a single bidentate group bonded to a Group III element, through two oxygen atoms,
L is a polymeric chain group chemically linked to A, the polymeric chain having repeating polyether spacer groups, the spacer groups providing distance between each anionic group,
p is the number of repeating units in the polymer,
q is charge on the anion,
$M^+$ is a cation,
b is the repeat number of compounds with a positive charge,
k is the charge on the compound with a positive charge, and
bk equals pq.

44. The electrolyte of claim 43, wherein AL of the polyanionic polymer chain has a formula:

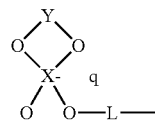

wherein X is a Group III element;
O is oxygen,
Y includes a formula $OC(CR^1_2)_aCO$, $SO_2$, aryl, phenyl, and $R^1$-substituted phenyl, wherein a ranges from 0 to 5,
$R^1$ is selected from the group consisting of alkyl 1,3 tetra(trifluoromethyl)ethylene dialato, halo 1,3 tetra(trifluoromethyl)ethylene dialato, and silane-co-tetraethyleneglycalato,
L comprises n spacer groups z, wherein z is selected from the group consisting of alkyl, $R^2$-substituted alkyl, alkoxy and $R^2$-substituted alkoxy,
wherein $R^2$ is selected from the group consisting of hydrogen, halo, alkyl, alkoxy, phenyl and substituted phenyl, wherein n ranges from about 1 to 30, and
p is a number from 1 to 3.

45. The electrolyte of claim 43, wherein $M^{+k}$ is selected from the group consisting of hydrogen, Group I metals, Group II metals, $NR_4$ and $PR_4$, and wherein R is selected from the group consisting of hydrogen, alkyl, and halo, and wherein k ranges from 1 to 3.

46. The electrolyte of claim 43, wherein the repeating spacer groups include a polysiloxane having the formula $Si[(CR_3)_2]-O(CR_2CR_2O)]_n$, and wherein n ranges from about 2 to 50, and wherein R is selected from the group consisting of hydrogen and alkyl.

47. The electrolyte of claim 43, wherein A comprises a borate anion having two oxygens bound to a dibasic acid residue and two oxygens bound to polymeric chain groups L, and wherein the polymeric chain group L includes n spacer groups z, and z includes $[(CR_2)_a(CR_2O)]n$, and wherein a ranges from about 0 to 50, and wherein R is selected from the group consisting of hydrogen, halo, hydroxyl, alkyl, alkenyl, alkoxy, phenyl and substituted phenyl, and wherein n ranges from about 1 to 30.

48. The electrolyte of claim 43, wherein polyanionic polymer chain is selected from the group consisting of poly [lithium oxalate oligo(ethylene glycolato)n orthoborate], poly [lithium oxalate oligo(propylene glycolato)n orthoborate], poly [lithium malonato oligo(ethyleneglycolato)n orthoborate], and poly [lithium malonato oligo(propylene glycolato)n orthoborate], and wherein n is 3,5,9 or 14.

49. The electrolyte of claim 43, wherein the solid polymer further has chemical bonds between the polymeric chains.

50. The electrolyte of claim 43, wherein the polyanionic polymer chain includes a plasticizer.

* * * * *

UNITED STATES PATENT AND TRADEMARK OFFICE
CERTIFICATE OF CORRECTION

PATENT NO. : 7,504,473 B2
APPLICATION NO. : 10/311643
DATED : March 17, 2009
INVENTOR(S) : Charles Austen Angell and Wu Xu It is certified that error appears in the above-identified patent and that said Letters Patent is hereby corrected as shown below:

IN THE CLAIMS:

Column 13, line 32 (Claim 4), delete "$(CR_2CR_2O)]_w$," and insert --$(CR_2CR_2O)_w$,--;

Column 13, line 40 (Claim 5), delete "$(CR^2{}_2O)$," and insert --$(CR^2{}_2O)]$,--;

Column 13, line 53 (Claim 9), delete "electrolyte" and insert --electrolyte,--;

Column 14, line 43 (Claim 12), delete "$(CR_2CR_2O)]_n$," and insert --$(CR_2CR_2O)_n$,--;

Column 14, line 51 (Claim 13), delete "$(CR_2O)]n$," and insert --$(CR_2O)]_n$--;

Column 15, line 1 (Claim 17), delete "electrolyte" and insert --electrolyte,--;

Column 16, line 4 (Claim 24), delete "$M_b{}^{+k}[AL]_p{}^{-1}$" and insert --$M_b{}^{+k}[AL]_p{}^{-q}$--;

Column 16, line 34 (Claim 24), delete "$M^{30}$" and insert --$M^+$--;

Column 16, line 56 (Claim 28), delete "$(CR^2{}_2O)$," and insert --$(CR^2{}_2O)]$--;

Column 17, line 22 (Claim 35), delete "element," and insert --element--;

Column 18, line 3 (Claim 38), delete "$(CR_2CR_2O)]_n$," and insert --$(CR_2CR_2O)_n$,--;

Column 18, line 10 (Claim 39), delete "z,-and" and insert --z, and--;

UNITED STATES PATENT AND TRADEMARK OFFICE
CERTIFICATE OF CORRECTION

PATENT NO. : 7,504,473 B2
APPLICATION NO. : 10/311643
DATED : March 17, 2009
INVENTOR(S) : Charles Austen Angell and Wu Xu It is certified that error appears in the above-identified patent and that said Letters Patent is hereby corrected as shown below:

Column 18, line 11 (Claim 39), delete "$(CR_2O)]n$," and insert --$(CR_2O)]_n$--;

Column 18, line 13 (Claim 39), delete "aklenyl," and insert --alkenyl--;

Column 18, line 44 (Claim 43), delete "element," and insert --element--;

Column 19, line 24 (Claim 46), delete "$(CR_2CR_2O)]_n$," and insert --$(CR_2CR_2O)_n$,--;

Column 20, line 7 (Claim 47), delete "$(CR_2O)]n$," and insert --$(CR_2O)]_n$--.

Signed and Sealed this

Nineteenth Day of May, 2009

JOHN DOLL
*Acting Director of the United States Patent and Trademark Office*